United States Patent
Ellis

(10) Patent No.: US 8,354,756 B2
(45) Date of Patent: Jan. 15, 2013

(54) VERTICAL AXIS TURBINE TO GENERATE WIND POWER

(76) Inventor: James Donald Ellis, Edina, MN (US)

( * ) Notice: Subject to any disclaimer, the term of this patent is extended or adjusted under 35 U.S.C. 154(b) by 550 days.

(21) Appl. No.: 12/408,625

(22) Filed: Mar. 20, 2009

(65) Prior Publication Data
US 2009/0284018 A1    Nov. 19, 2009

Related U.S. Application Data

(60) Provisional application No. 61/192,948, filed on Sep. 23, 2008, provisional application No. 61/070,206, filed on Mar. 20, 2008.

(51) Int. Cl.
*F03B 9/00* (2006.01)
*H02P 9/04* (2006.01)

(52) U.S. Cl. .......................... 290/44; 290/55

(58) Field of Classification Search .............. 415/2.1, 415/4.2, 4.4, 206, 207, 907; 416/7, 119, 416/132 B, 189, 197 A; 290/43–44, 54–55
See application file for complete search history.

(56) References Cited

U.S. PATENT DOCUMENTS

| | | | |
|---|---|---|---|
| 260,085 A | 6/1882 | Coloney | |
| 1,615,675 A | 1/1927 | Bender | |
| 3,779,618 A * | 12/1973 | Soglia et al. | 310/90.5 |
| 4,019,828 A | 4/1977 | Bunzer | |
| 4,157,482 A * | 6/1979 | Kakinuma | 310/155 |
| 4,260,325 A | 4/1981 | Cymara | |
| 4,321,005 A * | 3/1982 | Black | 415/4.2 |
| 4,329,593 A | 5/1982 | Willmouth | |
| 4,348,154 A * | 9/1982 | Ducker | 416/43 |
| 4,364,709 A | 12/1982 | Tornquist | |
| 4,508,972 A | 4/1985 | Willmouth | |
| 5,808,369 A | 9/1998 | Whelen | |
| 6,011,334 A | 1/2000 | Roland | |

(Continued)

FOREIGN PATENT DOCUMENTS

JP        6-307327 A    11/1994

(Continued)

OTHER PUBLICATIONS

"Annual Report on U.S. Wind Power Installation, Cost, and Performance Trends: 2007", U.S. Department of Energy, (May 2008), 45 pgs.

(Continued)

*Primary Examiner* — Tran Nguyen
(74) *Attorney, Agent, or Firm* — Schwegman Lundberg & Woessner, P.A.

(57) ABSTRACT

Usage of wind turbine systems that convert wind energy to electricity is expanding. The present inventor recognized that conventional systems are not suitable for more densely populated regions, are not effective in regions having lower average wind speeds, and are not visually appealing, quiet, and expandable. Accordingly, he devised, among other things, an exemplary vertical-axis wind turbine system that includes a novel wind turbine having cup-like blades that exhibit air-foil characteristics. The air-foil characteristics dramatically improve the efficiency of the turbine, not only making it effective at lower wind speeds than conventional wind turbines, but also more tolerant of extreme wind conditions. The exemplary system is compact and suitable for roof-top and water-surface installations. Additionally, the exemplary system includes a set of one or more hollow-bore field-wound electric generators, which are not only stackable, but selectively engageable based on measured wind speeds to provide full spectrum electrical generation.

20 Claims, 25 Drawing Sheets

U.S. PATENT DOCUMENTS

| | | | |
|---|---|---|---|
| 6,538,340 B2 | 3/2003 | Elder | |
| 6,652,221 B1 | 11/2003 | Praenkel | |
| 6,740,989 B2 | 5/2004 | Rowe | |
| 6,800,955 B2 | 10/2004 | McDavid, Jr. | |
| 6,870,280 B2 | 3/2005 | Pechler | |
| 6,911,745 B1 | 6/2005 | Howenstine et al. | |
| 7,109,599 B2 | 9/2006 | Watkins | |
| 2004/0140843 A1 | 7/2004 | Blank et al. | |
| 2006/0093483 A1 | 5/2006 | Brueckner | |
| 2006/0108809 A1 | 5/2006 | Scalzi | |
| 2006/0171798 A1 | 8/2006 | Yamamoto et al. | |
| 2006/0275105 A1* | 12/2006 | Roberts et al. | 415/4.2 |
| 2007/0224029 A1 | 9/2007 | Yokoi | |
| 2008/0273978 A1 | 11/2008 | Watkins | |

FOREIGN PATENT DOCUMENTS

| | | | |
|---|---|---|---|
| JP | 2007043824 A | * | 2/2007 |
| WO | WO-2009/117131 A1 | | 9/2009 |

OTHER PUBLICATIONS

"International Application Serial No. PCT/US2009/001750, International Search Report mailed Jul. 14, 2009", 4 ps.

"International Application Serial No. PCT/US2009/001750, Written Opinion mailed Jul. 14, 2009", 8 pgs.

Abraham, J., et al., "Induced co-flow and laminar-to-turbulent transition with synthetic jets", *Computers and Fluids*, 38(5), [online] [retrieved Apr. 14, 2008], (2008), 1011-1017.

Ackermann, T., *In: Wind Power in Power Systems*, John Wiley and Sons Ltd, Chichester, West Sussex, England, ., (2005), 73 pgs.

Barth, T. J., et al., "The design and application of upwind schemes on unstructured meshes", *American Institute of Aeronautics and Astronautics paper 89-0366, AIAA-1989-366, Aerospace Sciences Meeting, 27th*, (Reno, NV, Jan. 9-12, 1989), (1989), 13 pgs.

Bush, R. H., "A two-equation large eddy stress model for high sub-grid shear (Paper)", *American Institute of Aeronautics and Astronautics Computational Fluid Dynamics Conference, 15th*, (Anaheim, CA, Jun. 11-14, 2001), AIAA-2001-2561, (Jun. 2001), 11 pgs.

Ekaterinas, J. A., et al., "Computation of oscillating airfoil flows with one- and two-equation turbulence models", *American Institute of Aeronautics and Astronautics Journal*, 32(12), (Dec. 1994), 2359-2365.

Kays, W. M., et al., "Chapter 6—Differential Equations for the Turbulent Boundary Layer", *In: Convective Heat and Mass Transfer*, 4th Edition, McGraw-Hill Series in Mechanical Engineering, (2004), 52-79.

Ladd, J A, et al., "On the assessment of one- and two-equation turbulence models for the computation of impinging jet flowfields", *American Institute of Aeronautics and Astronautics paper. ASME, SAE, and ASEE, Joint Propulsion Conference and Exhibit, 32nd*, (Lake Buena Vista, FL, Jul. 1-3, 1996), 18 pgs.

Launder, B, et al., "The numerical computation of turbulent flows", *Computer Methods in Applied Mechanics and Engineering*, (Aug. 1990), 269-289.

Majumdar, S, "Role of underrelaxation in momentum interpolation for calculation of flow with nonstaggered grids", *Numerical Heat Transfer, Part B: Fundamentals: An International Journal of Computation and Methodology*, 1521-0626, 13(1), (1988), 125-132.

Malone, M, "Turbulence model evaluation for free shear dominated flows", *American Institute of Aeronautics and Astronautics Journal, and Electronic Library, AIAA-1996-2038, Fluid Dynamics Conference, 27th*, New Orleans, LA, Jun. 17-20, 1996, 11 pgs.

Menter, F. R., "Influence of freestream values on k-omega turbulence model predictions", *American Institute of Aeronautics and Astronautics Journal*, 30(6), (1992), 1657-1659.

Menter, F. R., "Ten years of industrial experience with the SST turbulence model", *Heat and Mass Transfer* 4, (2003), 8 pgs.

Menter, F. R., "Two-equation eddy-viscosity turbulence models for engineering applications", *American Institute of Aeronautics and Astronautics Journal*, (1994), 1598-1605.

Rhie, C M, et al., "Numerical study of the turbulent flow past an isolated airfoil with trailing edge separation", *American Institute of Aeronautics and Astronautics Journal*, 21(11), (1982), 1525-1532.

Rumsey, C. L., et al., "Turbulence Model Predictions of Strongly Curved Flow in a U-Duct", *American Institute of Aeronautics and Astronautics Journal*, 38(8), (2000), 1394-1402.

Wilcox, D, "Re-assessment of the scale-determining equation for advanced turbulence models", *American Institute of Aeronautics and Astronautics Journal*, 26. (1988), 1299-1310.

Wilcox, David C, "Comparison of two-equation turbulence models for boundary layers with pressure gradient", *American Institute of Aeronautics and Astronautics Journal*, 31(8) (1993), 1414-1421.

* cited by examiner

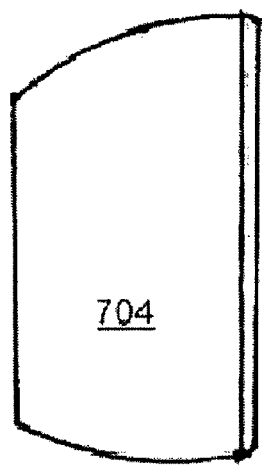
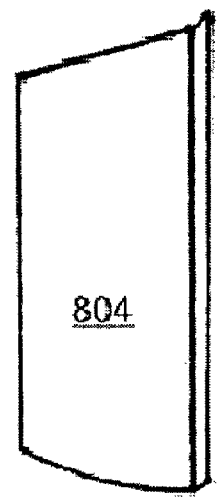
FIG. 7A               FIG. 8A
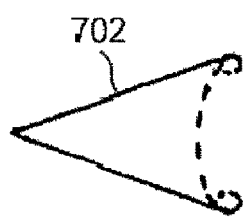
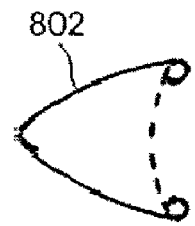
FIG. 7B               FIG. 8B
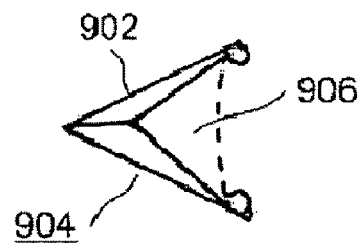
FIG. 9

VERTICAL AXIS TURBINE TO GENERATE WIND POWER

CROSS REFERENCE TO RELATED APPLICATION

The present application is related to the following U.S. Provisional Patent Applications: Ser. No. 60/919,250, filed Mar. 20, 2007; Ser. No. 61/070,206, filed Mar. 20, 2008; Ser. No. 61/192,948, filed Sep. 23, 2008, the specification of each of which is incorporated herein by reference in its entirety.

Additionally, the present application claims the benefit of priority under 35 USC 119(e) of U.S. Provisional Patent Applications Ser. No. 61/070,206, filed Mar. 20, 2008 and Ser. No. 61/192,948, filed Sep. 23, 2008.

COPYRIGHT NOTICE AND PERMISSION

A portion of the disclosure of this patent contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND

Recent years have witnessed intense interest and expanding usage of wind turbine systems that convert wind energy to electricity. Wind farms made of scores and even hundreds of such systems are taking over open expanses of land in the U.S. and elsewhere in the world at an increasing rate. Also, individual wind turbine systems are growing in popularity for businesses and homes in high-wind regions. Laws in many states have been passed to promote usage of wind turbine systems.

These systems typically include a tower, a horizontal-axis wind turbine, and an electric generator. The tower extends vertically from the ground and has a top portion supporting the horizontal-axis wind turbine. The horizontal-axis wind turbine has blades like airplane propellers that are fixed to a horizontal shaft, and coupled to the electric generator. In operation, sufficient wind rotates the blades and the shaft, which in turn rotates the electric generator to produce electricity.

The present inventor has recognized several problems with conventional horizontal-axis wind turbine systems. For example, these systems are generally unsuitable for densely populated urban landscapes because they require extensive space for their installation and operation, and are frequently regarded as unsightly and noisy. Moreover, many urban and suburban as well as industrial regions lack the high average wind speeds necessary to make conventional systems economically viable. Additionally, conventional systems are fixed-capacity systems that are not designed to be expanded or adapted to meet changing conditions, such as increased energy needs.

Accordingly, the present inventor has recognized unmet needs for commercially viable wind turbine systems that are suitable for more densely populated regions, that are effective in regions having lower average wind speeds, and that are visually appealing, quieter, and expandable.

SUMMARY

To address this and/or other needs, the present inventor devised among other things, exemplary vertical-axis wind turbine systems, components, and related methods. One exemplary vertical-axis wind turbine systems includes a novel wind turbine having cup-like blades that exhibit air-foil characteristics. The air-foil characteristics dramatically improve the efficiency of the turbine, not only making it effective at lower wind speeds than conventional wind turbines, but also more tolerant of extreme wind conditions. The exemplary system, which is compact and suitable for roof-top and water-surface installations, features an aesthetically pleasing housing that encloses the wind turbine blades, shielding it from birds, flying debris, and maintenance workers. Additionally, the exemplary system includes a set of one or more hollow-bore field-wound electric generators, which are not only stackable, but selectively engageable based on measured wind speeds to provide full spectrum electrical generation.

BRIEF DESCRIPTION OF THE DRAWINGS

FIG. 7A is a top view of a V-shaped cup with a circular concavity, according to some embodiments.

FIG. 7B is a side view of the cup of FIG. 7A.

FIG. 8A is a top view of a rounded V-shaped cup with a circular concavity, according to some embodiments.

FIG. 8B is a side view of the cup of FIG. 7A.

FIG. 9 is a side view of a V-shaped cup with a v-shaped concavity, according to some embodiments.

DETAILED DESCRIPTION

This description, which references and incorporates the above-identified figures and appended claims, describes one or more specific embodiments of one or more inventions. These embodiments, offered not to limit but only to exemplify and teach the one or more inventions, are shown and described in sufficient detail to enable those skilled in the art to implement or practice the invention. Thus, where appropriate to avoid obscuring the invention, the description may omit certain information known to those of skill in the art.

Moreover, other embodiments may incorporate structural, logical, electrical, process, and other changes. Examples merely typify possible variations. Individual components and functions are optional unless explicitly required, and the sequence of operations may vary. Portions and features of some embodiments may be included in, or substituted for, those of other embodiments. Embodiments set forth in the claims encompass all available equivalents of those claims.

Figure 1:
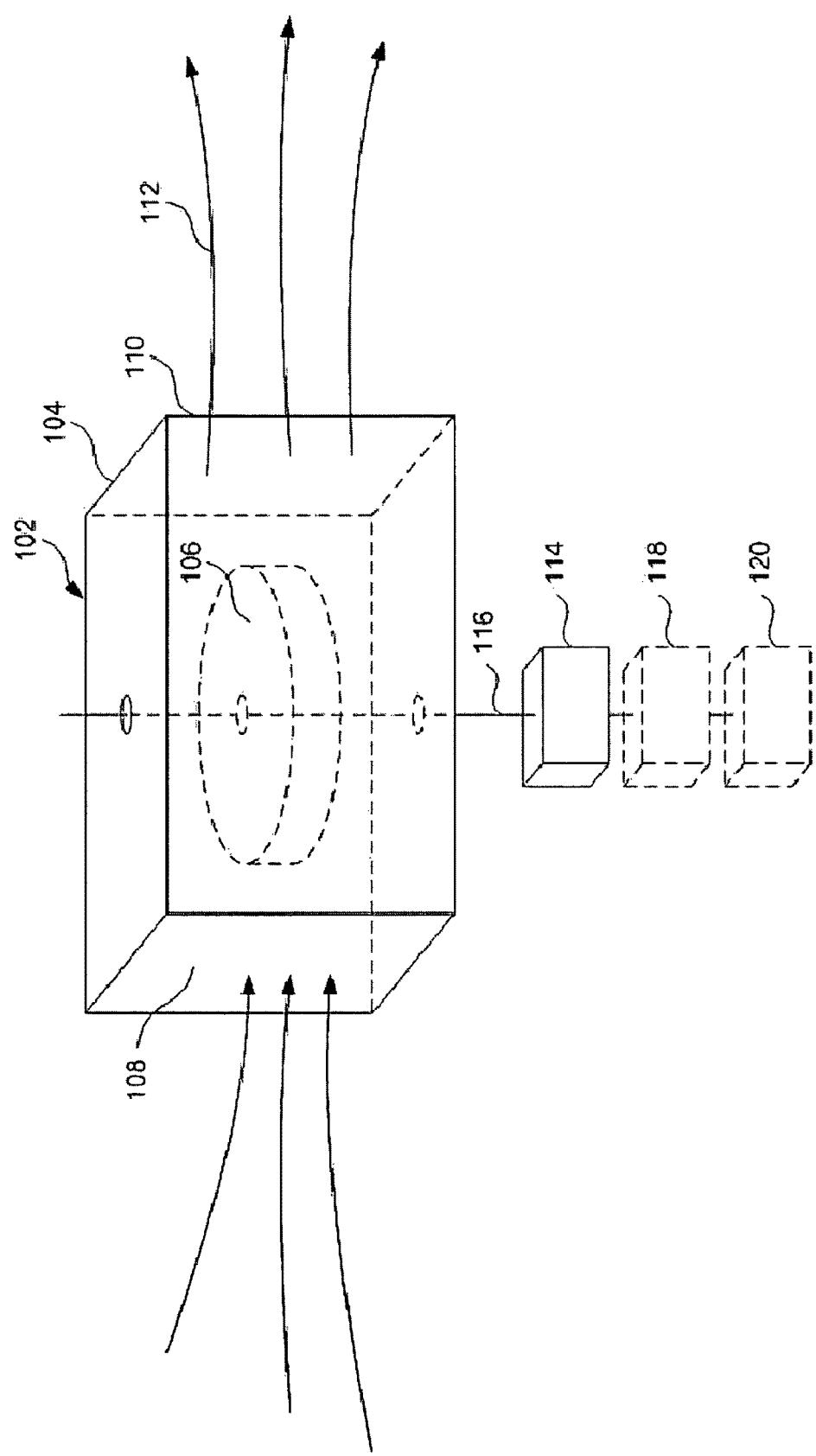
FIG. 1 is a perspective view of a wind powered generator system, according to some embodiments.

FIG. 1 is a perspective view of a wind powered generator system 102, according to some embodiments. In various embodiments, the generator system 102 includes a housing 104. Disposed in the housing is a rotor 106. The housing has an inlet 108 and an exit 110. Accordingly, wind 112 can pass into and out of the housing. The wind 112, when imparting enough pressure upon blades of the rotor, will turn the rotor.

One or more generators 114 (114 is typical) are coupled to a shaft or axel 116 of the generator system 102, in various embodiments. In various embodiments, the one or more generators 114 are releasably coupled to the to the shaft 116. For example, in some embodiments, one or more of the electricity generators 114 is coupled to the shaft 116 with a clutch or brake. In additional embodiments, one or more of the generators 114 in electric motor with electromagnets that are controllable to selectively impart magnetic influence on the shaft 116. For example, in some embodiments, the shaft 116 is coupled to a rotor of an induction motor, and one or both the rotor and the stator are powered to influence one another so that the generator 114 generates electricity when the shaft 116 is turned. In various embodiments the one or more electric generators 114 comprise a plurality of disk-shaped coils which are concentrically stacked vertically around a portion of the axel 116.

In various embodiments, one or more sensors measure the power generated by a first generator 114. In some embodiments, power is determined using an RPM sensor on the shaft and then correlating that with a lookup table stored in a computer device of the generator system 102 to determine how much power is being produced. If the power measured exceeds a threshold, such as a preprogrammed voltage stored in a computer device of the generator 114, a second generator 118 can be coupled to the axle 116. This coupling can be via any of the engagement means disclosed herein, including, but not limited to, clutches, brakes, and induction motors which have a field that is controlled by electronics. If the generators are DC powered, then the DC current produced by the generators will be increased as successive generators engage the axle of the rotor 106. The present subject matter is not limited to monitoring power, and may also monitor RPMs only, or other metrics such as torque produced. Various RPM sensors are contemplated including, but not limited to, hall effect sensors, lasers, counters, gears and other RPM sensors.

In some embodiments, the one or more generators 114 are selectively engaged to ensure that at least some electricity is being generated. For example, in some embodiments, a wind speed is too small to cause the rotor 106 to spin when the generator is engaged to generate full power, i.e., the magnetic fields of one or more of the rotor and stator are fully powered. In some embodiments, the magnetic fields of one or more of the rotor and stator are set to a reduced power so that the generator can begin to turn. Accordingly, in some embodiments, a wind speed as low as 2 miles per hour is enough to begin to produced electricity. Various embodiments additionally do not suffer from overspeed, instead saturating the rotor at a maximum velocity that will not damage the generator system 102. As such, some embodiments of the present subject matter are configured to produce electrical energy in wind currents ranging from 2 miles per hour to 60 miles per hour.

In various embodiments, the one or more generators 114 are mounted to the housing with a radial flange including a shoulder bolt, although other mounting schemes are additionally contemplated. In some examples, the axel 116 includes one or more keys and keyways to protect the generators and/or rotors from damage should one or the other become jammed or reach an overspeed condition.

In various embodiments, the one or more generators 114 are coupled to the axel 116 with an eccentric couple and/or a B-lock mechanism. In some embodiments, one or more generators includes a hollow shaft through which another shaft can pass to couple to a second generator. In various embodiments, the axel 116 is supported by one or more magnetic air bearings.

Figure 2:
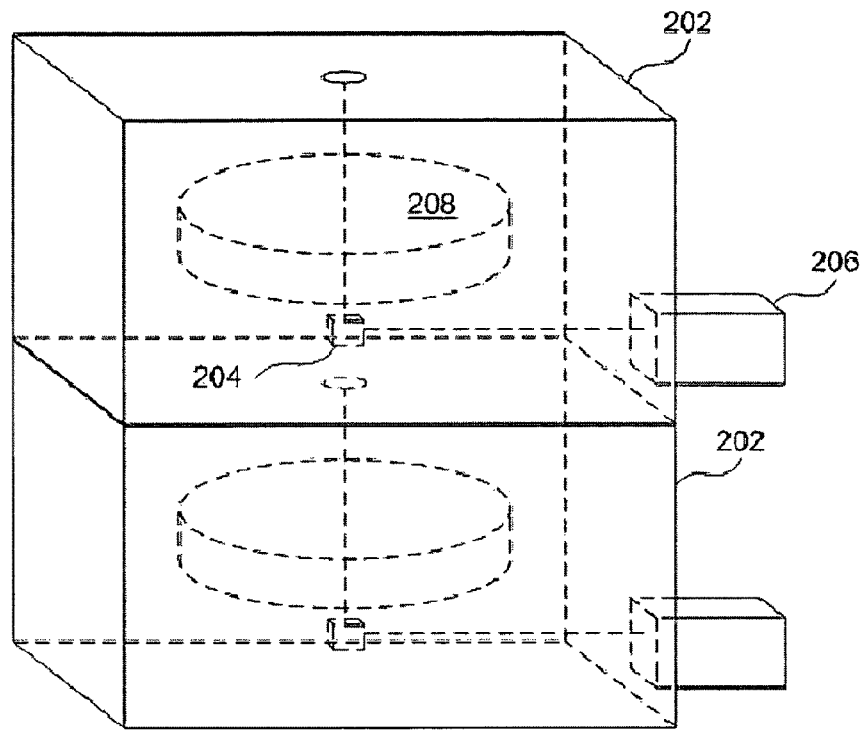
FIG. 2 is a perspective view of stacked wind powered generator systems, according to some embodiments.

FIG. 2 is a perspective view of stacked wind powered generator systems, according to some embodiments. In various embodiments, each generator system includes a housing 202 (202 is typical). The housing are stacked, in various embodiments. In various embodiments, the rotors 208 (208 is typical) of the respective housing are not coupled together. Accordingly, the generators 206 (206 is typical) each independently produce power.

In various embodiments, the one or more mechanical power converters 204 (204 is typical) are used. The one or more power converts can include, but are not limited to, pulleys, gears, rollers, cams, linkages (e.g., a pin offset to the center of a hub) and other devices.

Figure 3:
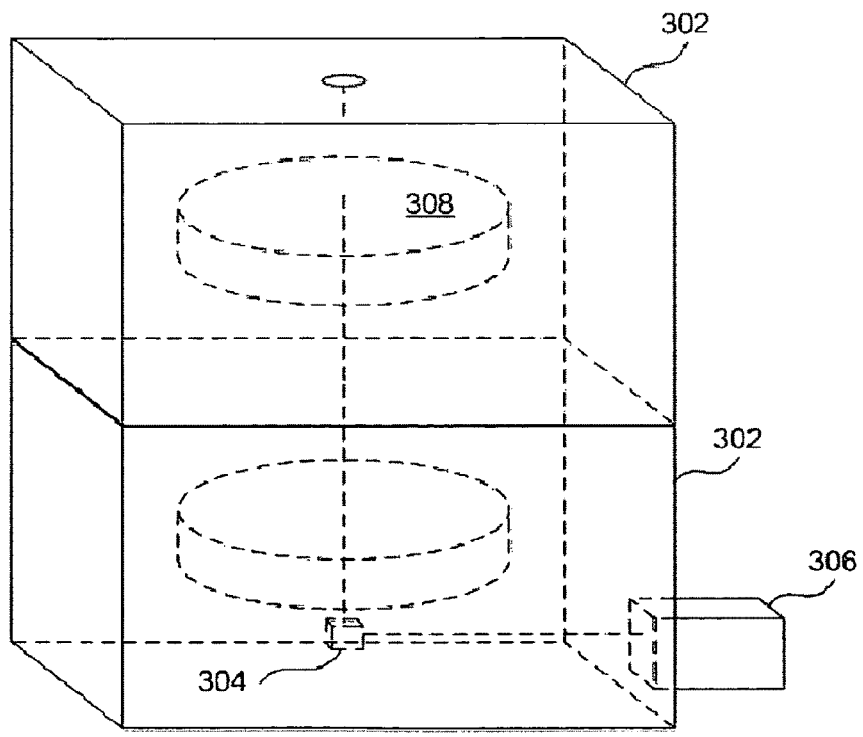
FIG. 3 is a perspective view of stacked wind powered generator systems with axels that are coupled, according to some embodiments.

FIG. 3 is a perspective view of stacked wind powered generator systems with axels that are coupled, according to some embodiments. In various embodiments, each generator system includes a housing 302 (302 is typical). The housing are stacked, in various embodiments. In various embodiments, the rotors 308 (308 is typical) of the respective housing are coupled together. Accordingly, a generator 306 is powered by a plurality of rotors. A mechanical power converters 304 is used to transmit power to the generator 306.

In various embodiments, the plurality of generator systems do not suffer from unwanted pulley loss because they directly couple a number of rotors together, improving efficiency. In some embodiments, lower rpm designs, that spin at, for example, 250 to 500 rpm will not require gearboxes, as there are generators that are available that are compatible with those speeds and do not require mechanical amplification. In various embodiments, axles of one or more rotors 308 are coupled with any of a variety of couplers, including, but not limited to, love-joy couplers.

In some embodiments, an array of generator systems are installed along a hillside. In some embodiments, power produced by each generator system is monitored. In some of these embodiments, if one generator is recognized to produce more power than another generator in the array, only that generator later receives a second generator stacked onto it. In monitoring a hillside in this manner, a power generation array can efficiently adapt to the unique wind current profile of a region. Because the present subject matter allows for stackable generator systems, wind power users can easily augment the power they generate and collect from wind currents without greatly expanding the real estate used to generate wind.

Figure 4A:
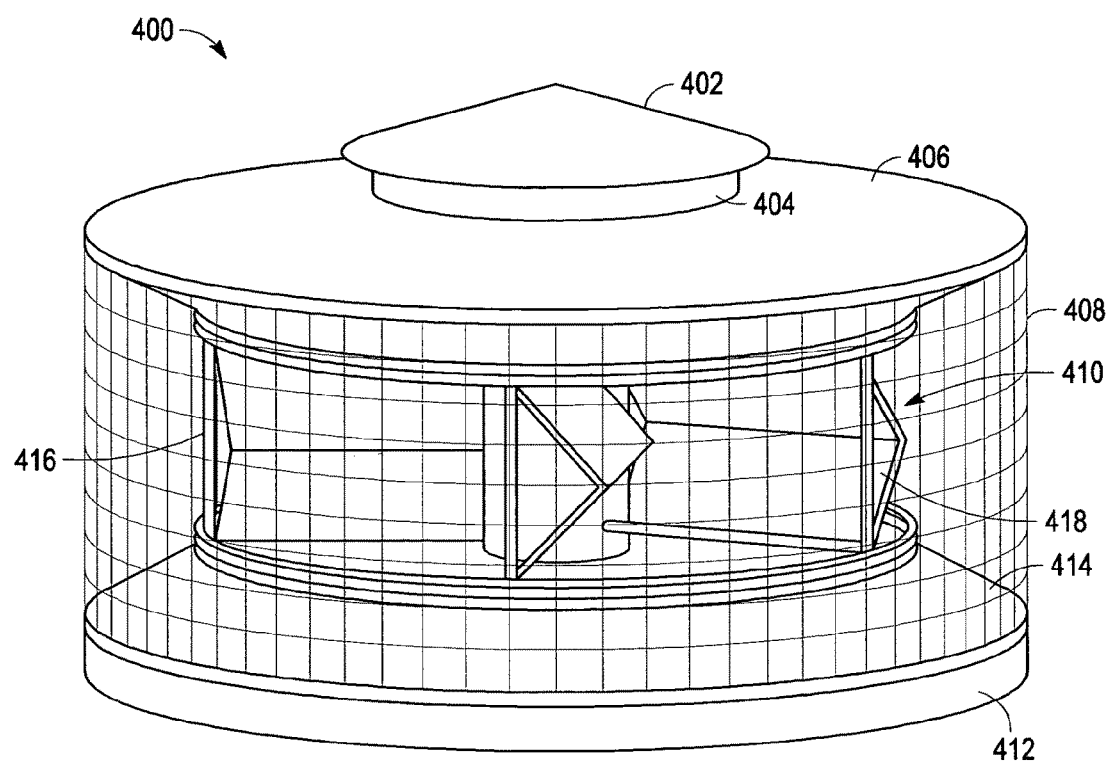
FIG. 4A is a perspective view of a wind powered generator system with V-shaped cups, according to some embodiments.
Figure 4B:
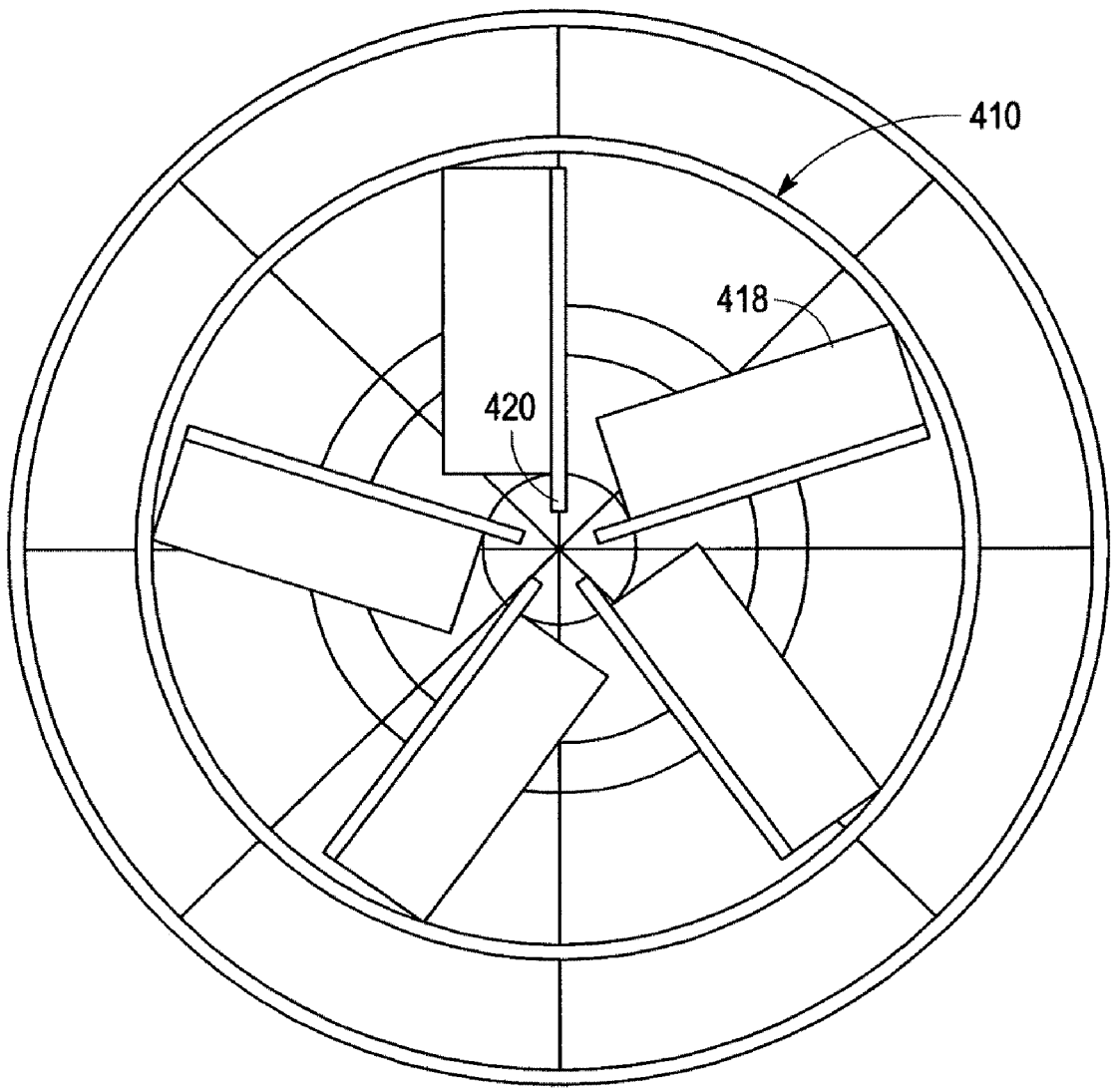
FIG. 4B is a top view of the generator system of FIG. 4A.

FIG. 4A is a perspective view of a wind powered generator system with V-shaped cups, according to some embodiments. FIG. 4B is a top view of the generator system of FIG. 4A. The system includes a housing that includes a top 406 that is coupled to a bottom 412 via a safety screen 408 and one or more option supports 416. The housing can be formed of sheet metal or some analog thereof. In some embodiments, the housing top 406 is frustoconical shaped, but the present subject matter is not so limited. In various embodiments, a rotor 410 is rotably mounted to the housing. In various embodiments, the housing includes ducted surfaces 414 to direct gas from outside the housing to inside the housing toward the rotor 410. Although the present housing is shown surrounded by a screen, the present subject matter is not so limited an other configurations are contemplated, including those in which the rotor is only partially open to the exterior of the housing.

Various embodiments include a top 402. In various embodiments, the top includes a grade to repel water, but the present subject matter is not so limited. Accordingly, in some embodiments, the top is conical. In various embodiment, a space 404 between the top 402 and the housing top 406 is open. In some embodiments, this permits air to enter the generator system to travel along the blades and exit the housing through the screen 408. Accordingly, in some embodiments, the generator system 400 acts like a centrifugal pump. In some embodiments, air exits the system 400 through the space 404. In some embodiments, the space 404 can be closed to improve generator efficiency if a measurement determines that closing the space 404 would benefit system 400 efficiency.

Some embodiments include an opening 412 along the bottom 414, that can serve in a similar capacity to the top 406. In some embodiments, one or more electrical generators are housed in the bottom 414. In some embodiments, the bottom 414 includes a footprint that is sufficient to support the system 400 on a predetermined surface, such as sand, ice, topsoil, or another surface.

Figure 5C:
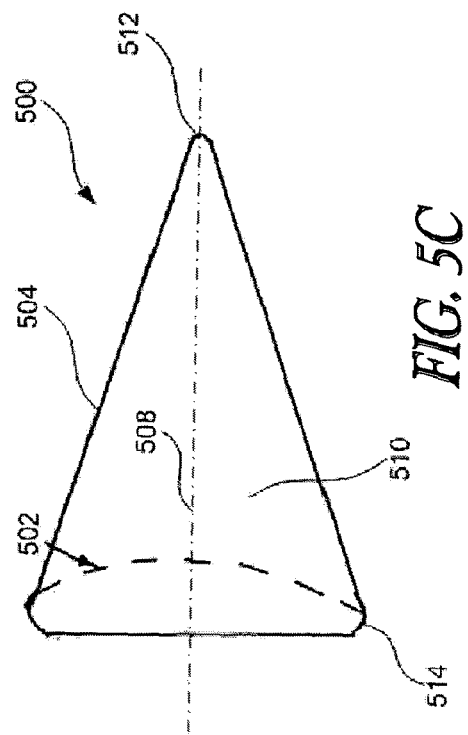
FIG. 5C is a top view of the V-shaped cup of FIG. 5A.
Figure 5A:
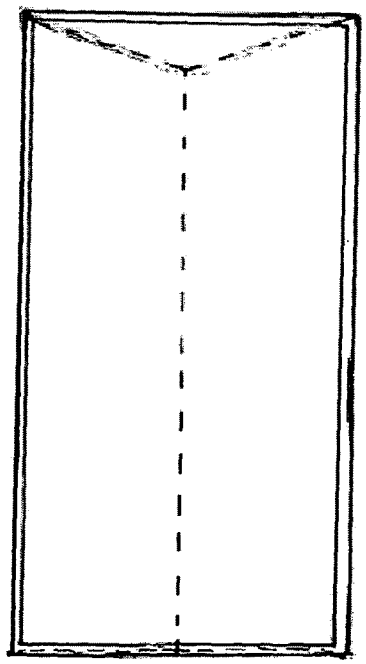
FIG. 5A is a front view of a V-shaped cup, according to some embodiments.
Figure 5B:
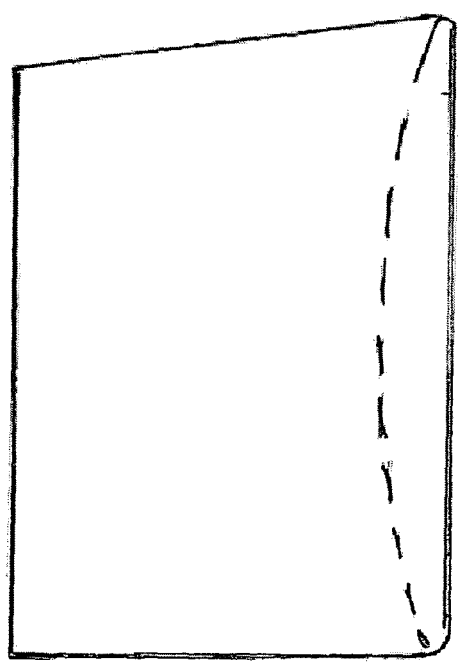
FIG. 5B is a front view of the V-shaped cup of FIG. 5A.

FIG. 5A is a front view of a V-shaped cup 500 500, according to some embodiments. FIG. 5B is a front view of the V-shaped cup 500 of FIG. 5A. FIG. 5C is a top view of the V-shaped cup 500 of FIG. 5A. In various embodiments, the V-Shaped cup is symmetrical along a plane 508, although the present subject matter is not so limited. In various embodiments, the V-Shaped cups are improved blades for converting wind to electrical energy. In various embodiments, each blade has a back hump surface or tail 504 and a front surface 502. In various embodiments, each blade exhibits an air-foil lift force in response to impinging wind energy. In various embodiments, each blade 500 can be coupled to an axle to rotate the axel in the wind. In various embodiments, the back surface 504 of each blade is shaped to efficiently pass through wind turbulence left by another blade, as disclosed herein. In various embodiments, back hump surface 504 and the front surface 502 meet to define a substantially closed volume. In various embodiments, the front surface 502 is concave. In additional embodiments, each cup-like mass defines an hollow interior region 510. In some embodiments, the blades are created from joining two pieces together. For example, in some embodiments, the front surface 502 is molded, the back hump surface 504 is molded, and the two surfaces are joined along a seam 514. In various embodiments, each blade includes an endcap 506 to better keep air on the blade during the blade's travel through the wind current.

Figure 6C:
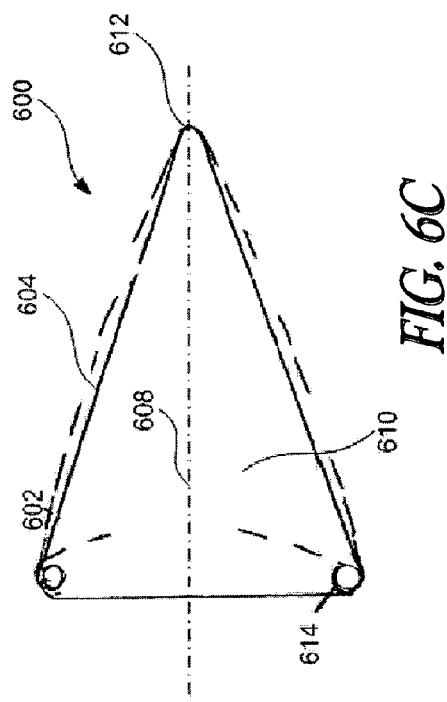
FIG. 6C is a top view of the V-shaped cup of FIG. 6A.
Figure 6A:
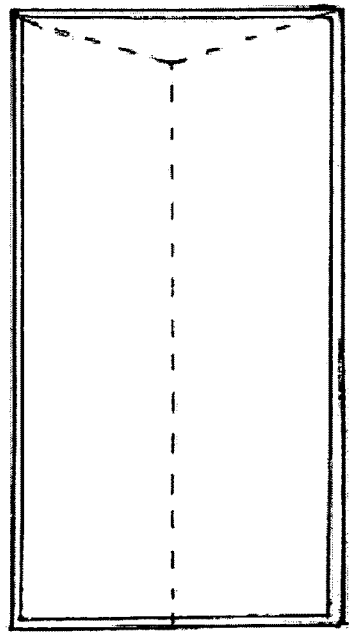
FIG. 6A is a front view of a V-shaped cup, according to some embodiments.
Figure 6B:
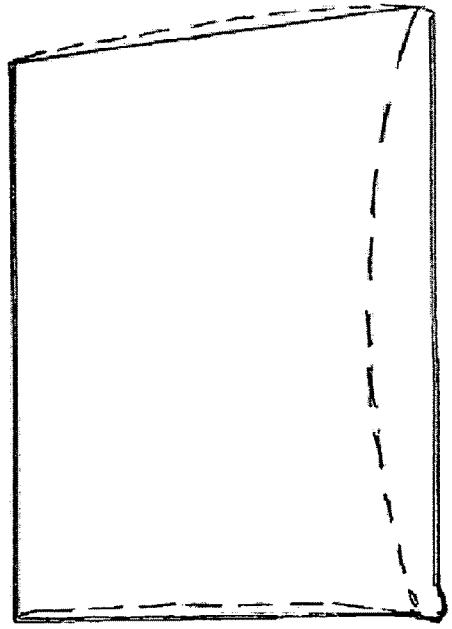
FIG. 6B is a front view of the V-shaped cup of FIG. 6A.

FIG. 6A is a front view of a V-shaped cup, according to some embodiments. FIG. 6B is a front view of the V-shaped cup of FIG. 6A. FIG. 6C is a top view of the V-shaped cup of FIG. 6A. In various embodiments, the V-Shaped cup is symmetrical along a plane 608, although the present subject matter is not so limited. In various embodiments, the V-Shaped cups are improved blades for converting wind to electrical energy. In various embodiments, each blade has a back hump surface 604 and a front surface 602. In various embodiments, each blade exhibits an air-foil lift force in response to impinging wind energy. In various embodiments, each blade 600 can be coupled to an axle to rotate the axel in the wind. In various embodiments, the back surface 604 of each blade is shaped to efficiently pass through wind turbulence left by another blade, as disclosed herein. In various embodiments, back hump surface 604 and the front surface 602 meet to define a substantially closed volume. In various embodiments, the front surface 602 is concave. In additional embodiments, each cup-like mass defines an hollow interior region 610. In some embodiments, the blades are created from joining two pieces together. For example, in some embodiments, the front surface 602 is molded, the back hump surface 604 is molded, and the two surfaces are joined along a seam 614. In various embodiments, a frame 616 is used to assist the blade 600 in retaining its shape. In various embodiments, each blade includes an endcap 606 to better keep air on the blade during the blade's travel through the wind current.

FIG. 7A is a top view of a V-shaped cup 702 with a circular concavity, according to some embodiments. FIG. 7B is a side view of the cup of FIG. 7A. The cup includes a planar surface 704

FIG. 8A is a top view of a rounded V-shaped cup with a circular concavity, according to some embodiments. FIG. 8B is a side view of the cup 802 of FIG. 8A. The cup includes a rounded surface 804.

FIG. 9 is a side view of a V-shaped cup 902 with a v-shaped concavity, according to some embodiments. The endplate 906, which is laterally away from a rotor center of a generator system, is smaller than an endplate more closely oriented toward the rotor center. The blades of FIGS. 7-9 are examples and are not limited as to the scope of shapes considered.

Figure 10A:
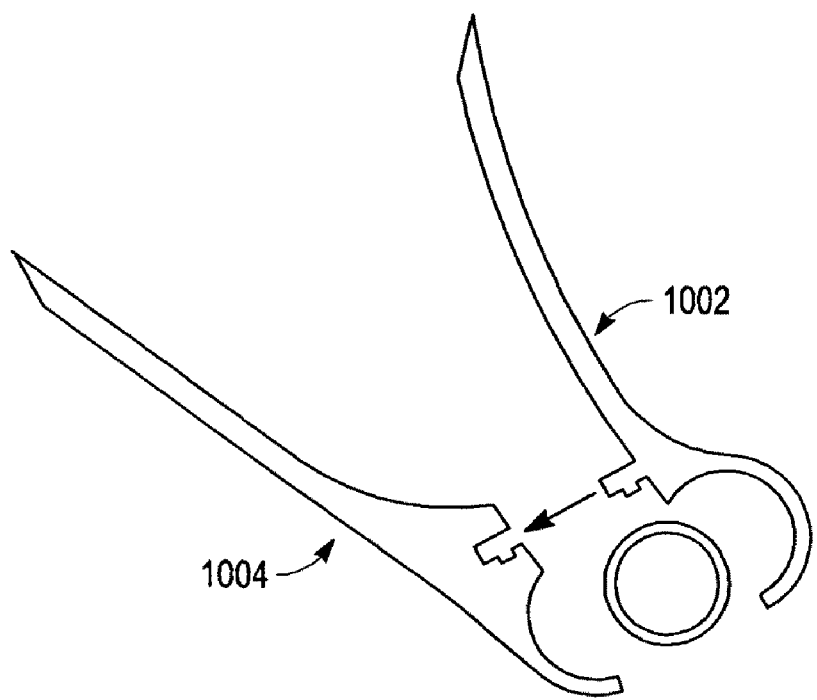
FIG. 10A is a disassembled cup joint, according to some embodiments.
Figure 10B:
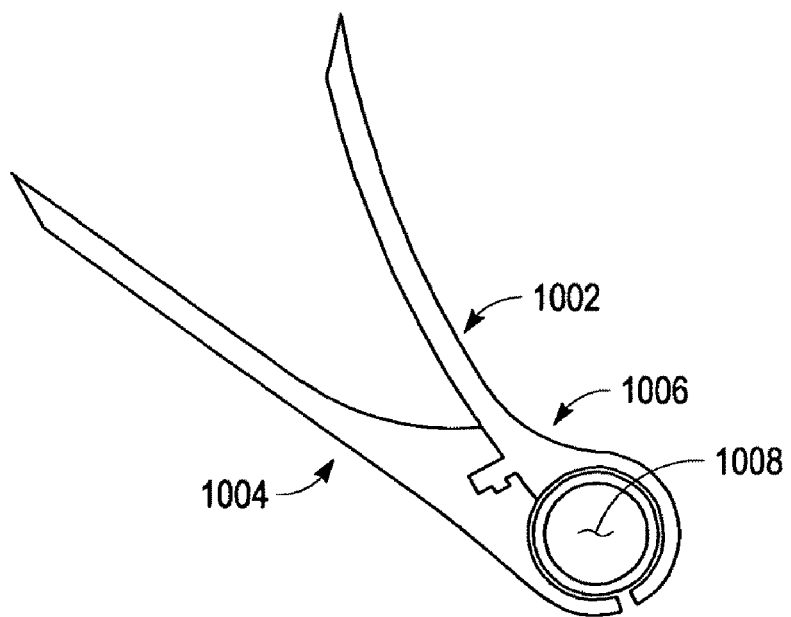
FIG. 10B is an assembled view of the pieces of FIG. 10A.

FIG. 10A is a disassembled cup joint, according to some embodiments. FIG. 10B is an assembled view of the pieces of FIG. 10A. In various body, a front face 1002 is couplable to a back surface 1004 of a blade around a frame 1008. In various embodiments, a snap connector 1006 is used, although other connectors are possible.

Figure 11:
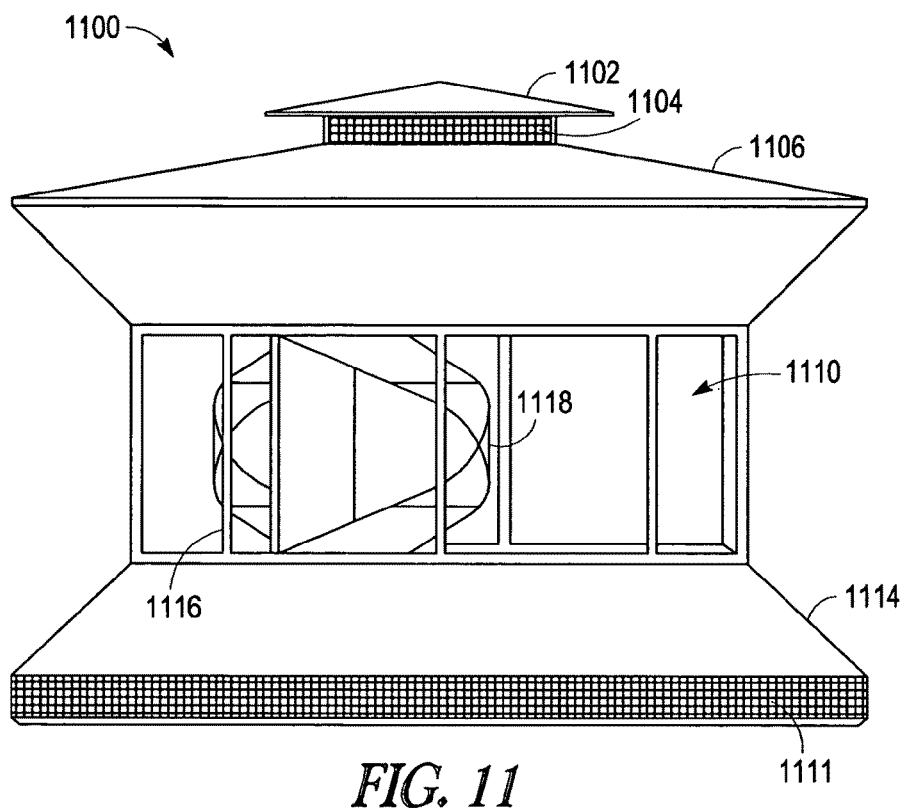
FIG. 11 is a side view of a generator system with rounded, symmetrical, square cups with circular concavities, according to some embodiments.
Figure 12:
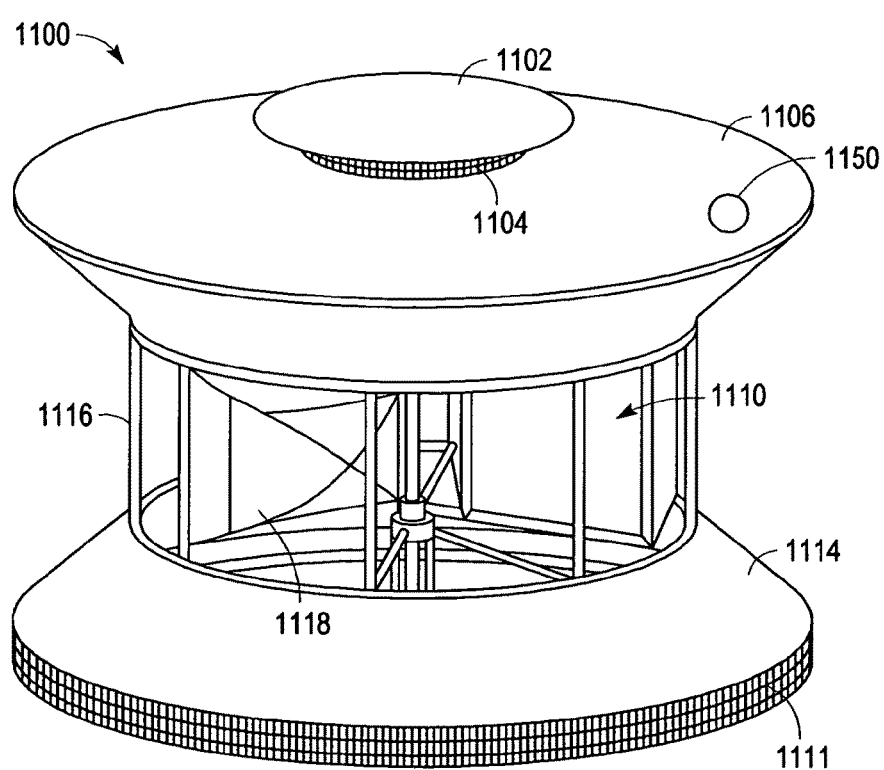
FIG. 12 is a perspective view of the generator system of FIG. 11A.

FIG. 11 is a side view of a generator system with rounded, symmetrical, square cups with circular concavities, according to some embodiments. FIG. 12 is a perspective view of the generator system of FIG. 11.

The system includes a housing that includes a top 1106 that is coupled to a bottom 1112 via a safety screen 1108 and one or more option supports 1116. In some embodiments, the housing top 1106 is frustoconical shaped, but the present subject matter is not so limited. In various embodiments, a rotor 1110 is rotably mounted to the housing. In various embodiments, the housing includes ducted surfaces 1114 to direct gas from outside the housing to inside the housing toward the rotor 1110. Although the present housing is shown surrounded by a screen, the present subject matter is not so limited an other configurations are contemplated, including those in which the rotor is only partially open to the exterior of the housing.

Various embodiments include a top 1102. In various embodiments, the top includes a grade to repel water, but the present subject matter is not so limited. Accordingly, in some embodiments, the top is conical. In various embodiment, a space 1104 between the top 1102 and the housing top 1106 is open. In some embodiments, this permits air to enter the generator system to travel along the blades and exit the housing through the screen 1108. Accordingly, in some embodiments, the generator system 1100 acts like a centrifugal pump. In some embodiments, air exits the system 1100 through the space 1104. In some embodiments, the space 1104 can be closed to improve generator efficiency if a measurement determines that closing the space 1104 would benefit system 1100 efficiency.

Some embodiments include an opening 1112 along the bottom 1114, that can serve in a similar capacity to the top 1106. In some embodiments, one or more electrical generators are housed in the bottom 1114. In some embodiments, the bottom 1114 includes a footprint that is sufficient to support the system 1100 on a predetermined surface, such as sand, ice, topsoil, or another surface. Various embodiments include a green indicator light 1150 which indicates when the electric generator is generating electric current.

Figure 13A:
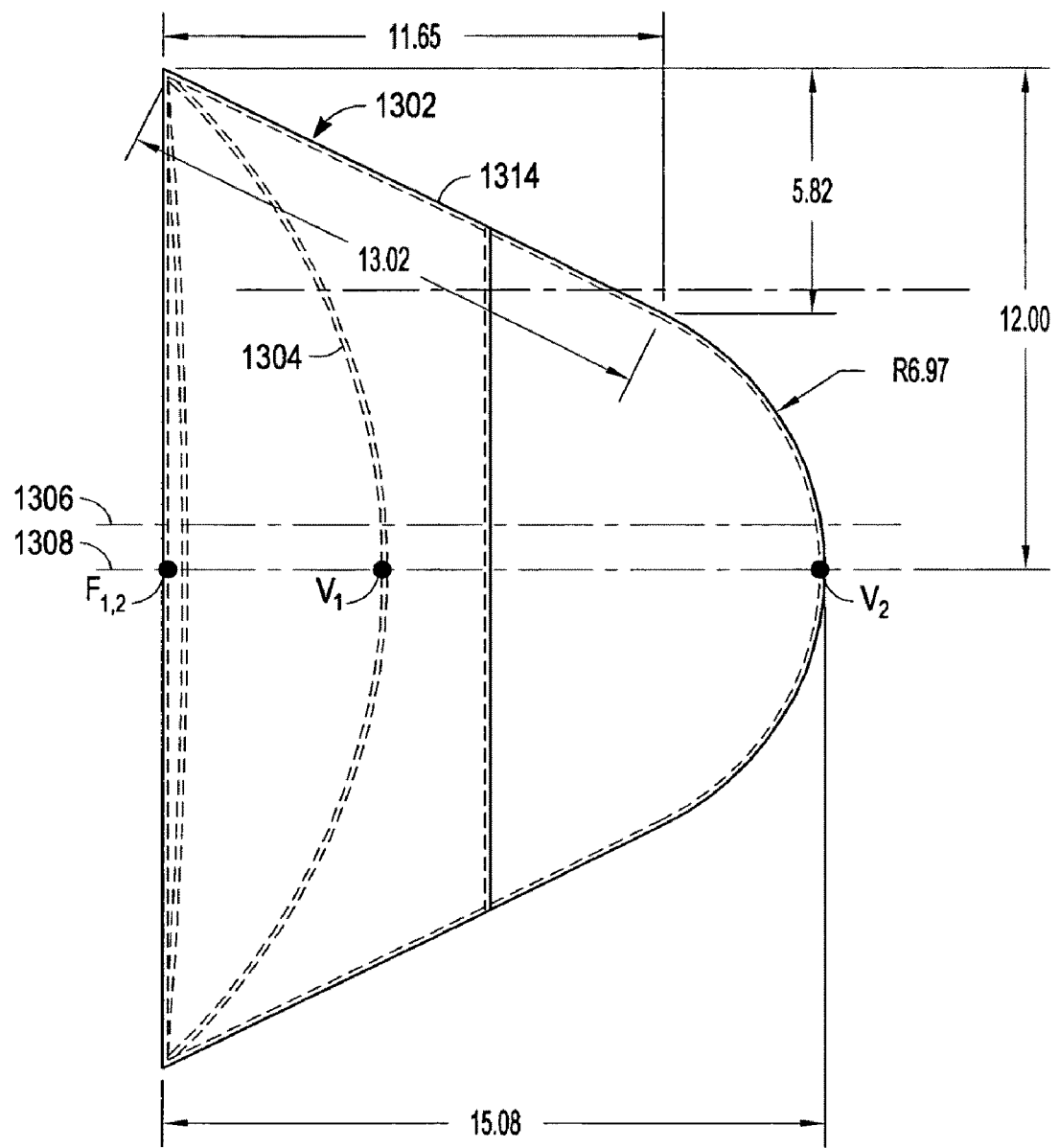
FIG. 13A is a side view of a cup shaped blade, according to some embodiments.
Figure 13B:
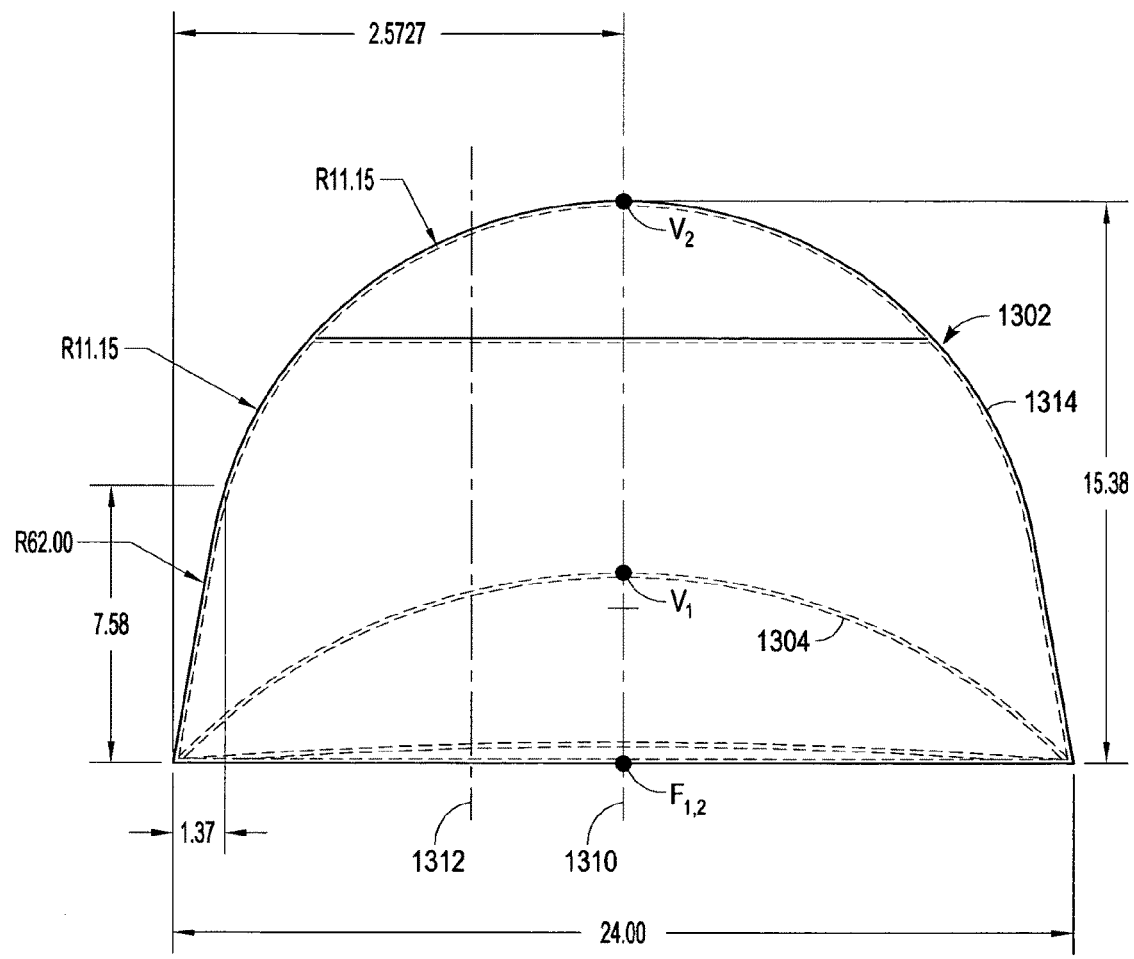
FIG. 13B is a top view of the cup shaped blade of FIG. 13A.

FIG. 13A is a side view of a cup shaped blade, according to some embodiments. FIG. 13B is a top view of the cup shaped blade of FIG. 13A. The dimensions on the print are related to one embodiment, although further embodiments are possible. The dimensions show compound curves which are herein referred to as parabolic shapes. Various embodiments include a plurality of cup shaped blades 1302. Each of these is couplable to an axel of a generator system, and the plurality is distributed around a center axis that passes through the axel. In various embodiments, each blade includes a concave face 1304. In various embodiments, the face has a parabolic concavity. Parabolic concavities, as used herein, are not limited to exact mathematical parabolas, but include shapes that resemble parabolas, including curvilinear shapes and shapes formed of compound arcs including at least two radius of different magnitudes. In various embodiments, the concave face 1304 has a concavity that is parabolic shaped along a plane parallel to a center axis of an axel. For example, either of planes 1310 or 1312 would be parabola shaped. In various embodiments, each of these parabolic concavity having a first focus $F_1$ and a first vertex $V_1$. In various embodiments, each of the blades includes a convex tail 1314 having an exterior surface that is parabolic along the plane parallel to the center axis, such as planes 1310 or 1312. In various embodiments, the exterior surface 1314 has second focus $F_2$ coincident the first focus $F_1$ in the plane 1310 and a second vertex $V_2$ in the plane 1310. In various embodiments, the distance between the first focus $F_1$ and the first vertex $V_1$ is less than a distance between the second focus $F_2$ and the second vertex $V_2$. In various embodiments, the distance between the first focus $F_1$ and the first vertex $V_1$ is around one third of distance between the second focus $F_2$ and the second vertex $V_2$ In various embodiments, the concave face 1304 has a further parabolic cross section taken along a plane normal to the center axis. For example, this further parabolic cross section could exist along any of planes 1306 or 1308. Again, the term "parabolic" is not limited to exact parabolas. In various embodiments, convex tail has a parabolic shape along the plane normal to the center axis. For example, these planes could exist along any of planes 1306 or 1308.

In various embodiments, each of the plurality of blades 1302 is symmetrical along the plane parallel to the center axis. This symmetry can be along one or both of plane 1310. In various embodiments, each of the plurality of blades is symmetrical along a plane normal to the center axis. This symmetry can be along one or both of plane 1308. In various embodiments, the concave face 1304 includes a first parabolic surface, and the convex tail 1314 includes a second parabolic surface, with the first and second surfaces joining at a joint 1316 that circumscribes the concave face 1304 along a joint plane. In various embodiments, the concave face is square in a front view. In various embodiments, the center axis of a rotor is in the joint plane, although offsets are possible.

Figure 14:
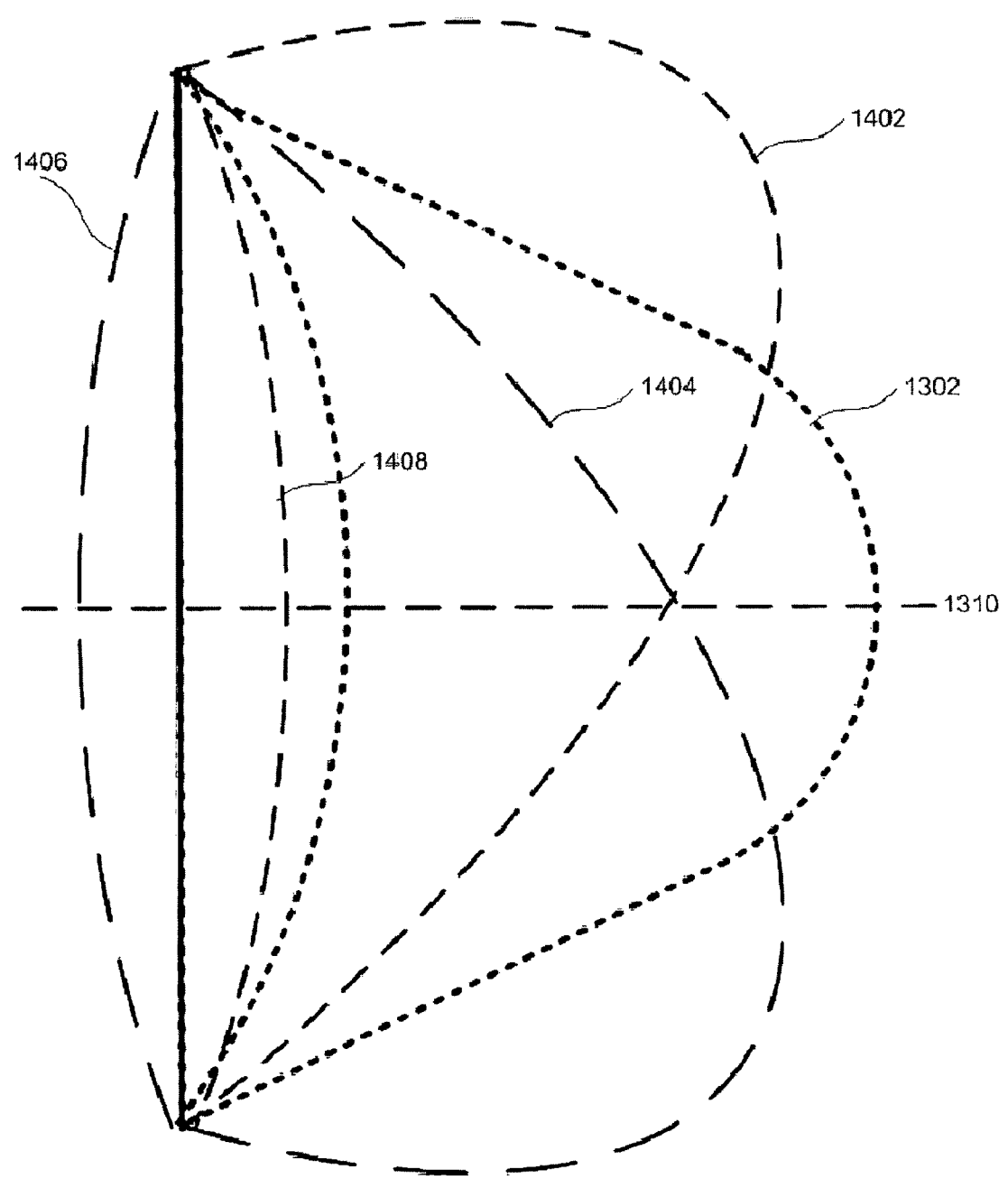
FIG. 14 is a diagram of several blade profiles.

FIG. 14 is a diagram of several blade profiles. In various embodiments, the convex tail is offset toward a center axis, as shown with tail 1402. In additional embodiments, it is offset away from a center axis, as shown with tail 1404. The present subject matter is not limited to front faces of a first concavity, and includes those that are more shallow as illustrated in 1408, as well as those that are not concave, such as face 1406.

Figure 15:
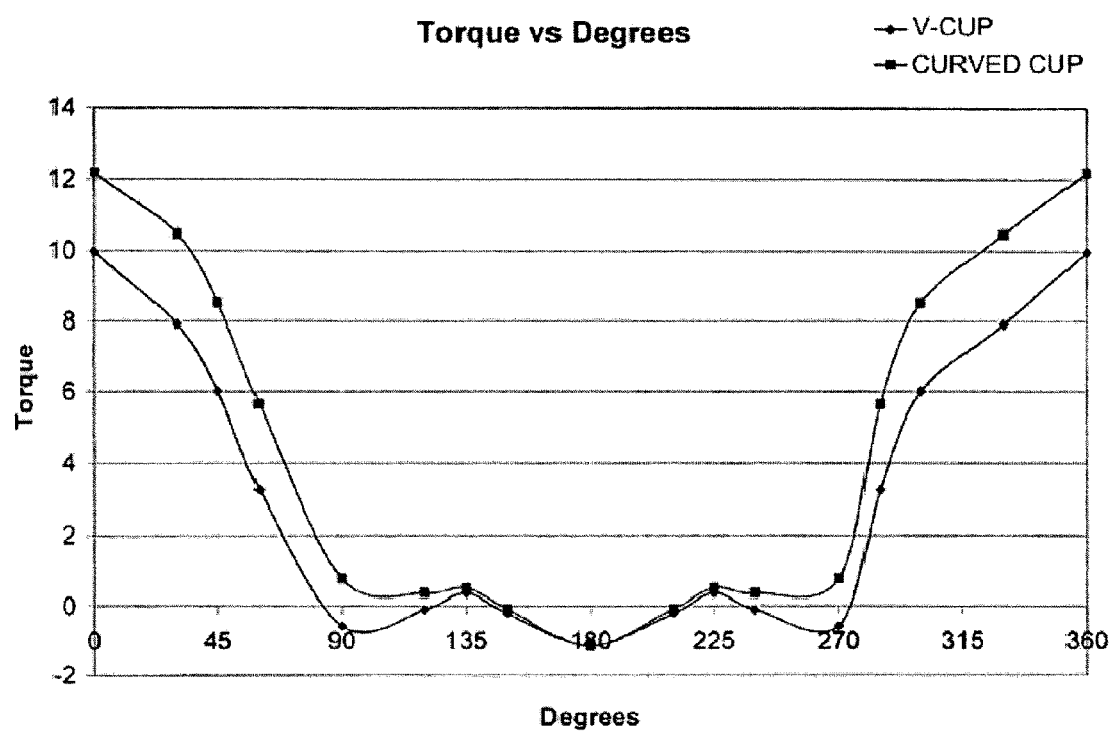
FIG. 15 is a chart showing the performance of two blade profiles, according to some embodiments.

FIG. 15 is a chart showing the performance of two blade profiles, according to some embodiments. The performance of a V-Cup, such as that shown in FIGS. 5A-C is shown against the performance of a curved cup, such as that shown in FIGS. 13A-B.

The cups of a standard anemometer are round, and dish shaped, or curved like a pop-can cut in half lengthwise. The problem with this design is that it pushes the air that comes off the leading cup. Thus, it nearly pushes as much air as it catches. Because of this, there is a great deal of turbulence created. This turbulence causes inefficiencies, and the standard Savonius Rotor has an estimated @ 14% efficiency. This is not efficient. The present blade designs are more efficient because they have a back surface that is distanced from the front face.

Figure 16:
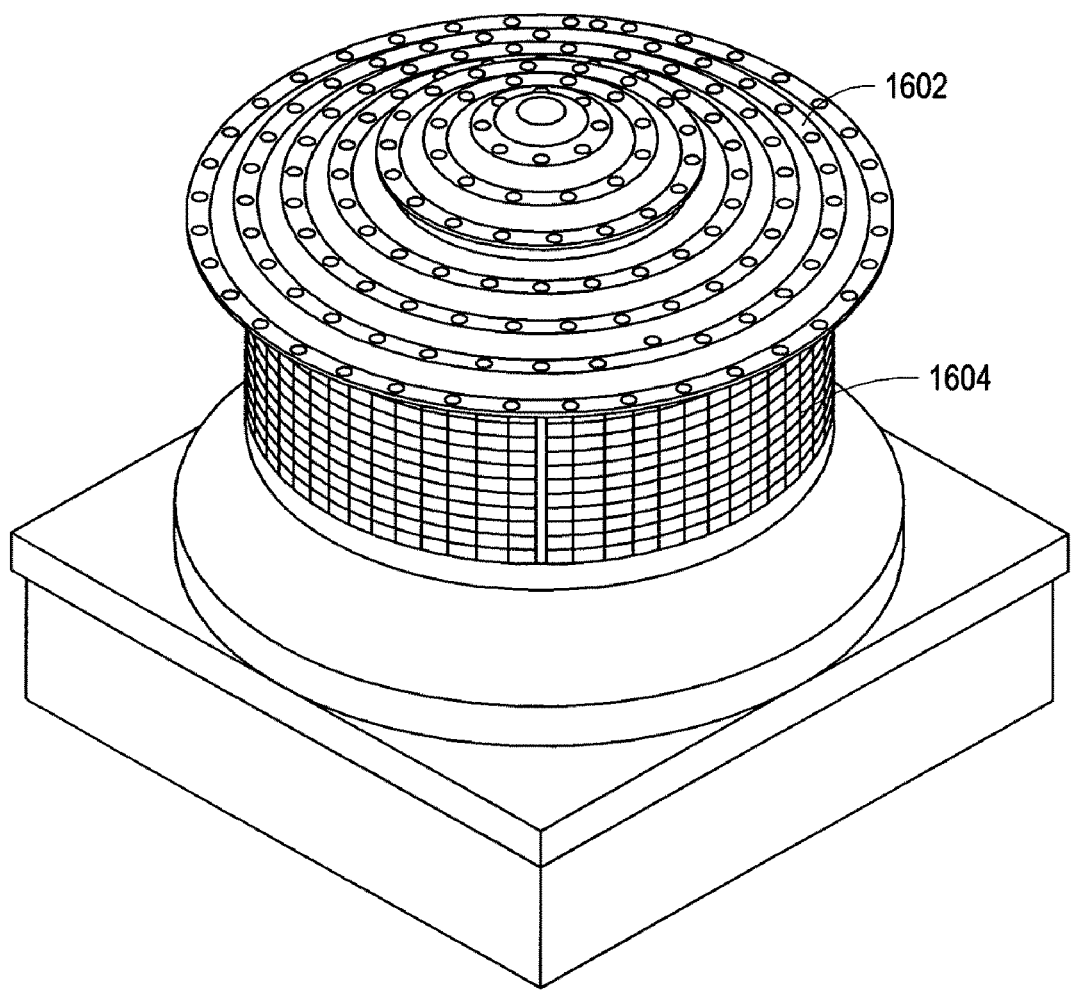
FIG. 16 is a perspective view of a generator system with solar panels, according to some embodiments.

FIG. 16 is a perspective view of a generator with solar panels, according to some embodiments. A generator system 1604 is shown with solar panels 1602 affixed to the top.

Figure 17:
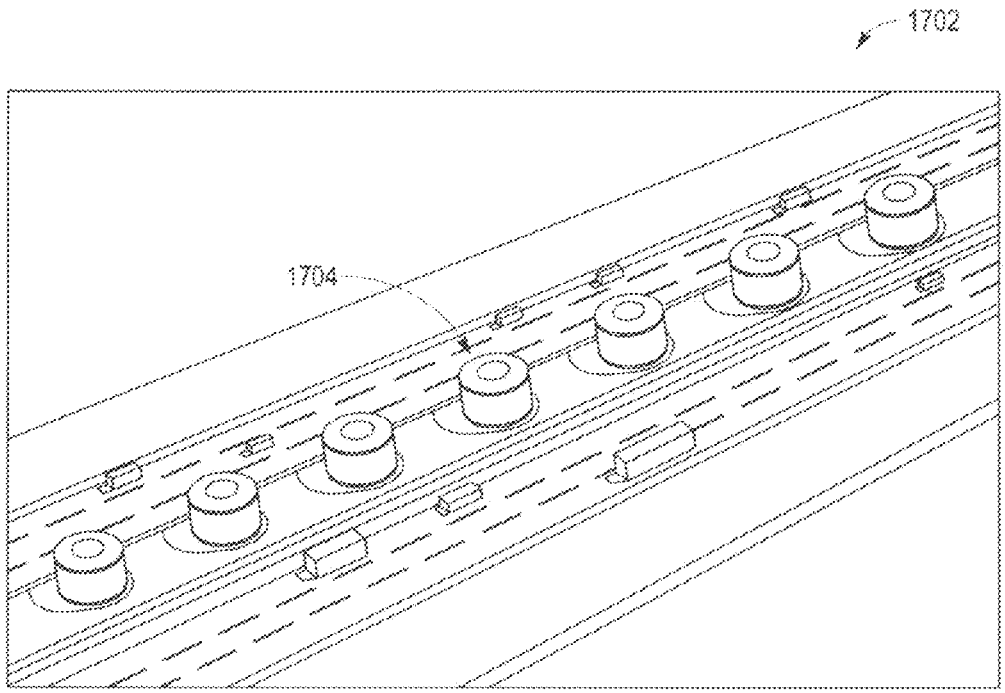
FIG. 17 shows several generator systems installed on a highway median, according to some embodiments.

FIG. 17 shows several generators installed on a highway median, according to some embodiments. A roadway system 1702 is shown with generator system 1704 (1704 is typical). The traffic generates wind currents which move the rotors of the generator systems 1704.

Figure 18:
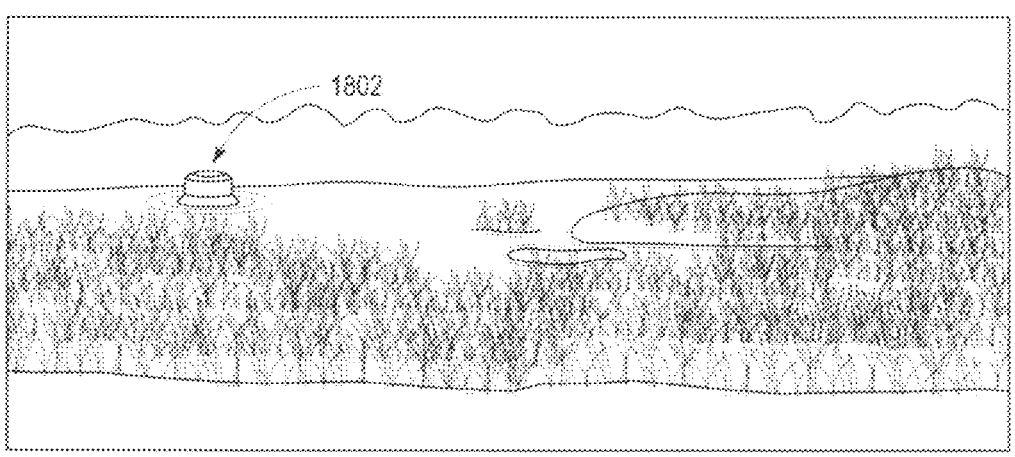
FIG. 18 shows a generator system coupled to floats to float in water, according to some embodiments.
Figure 19:
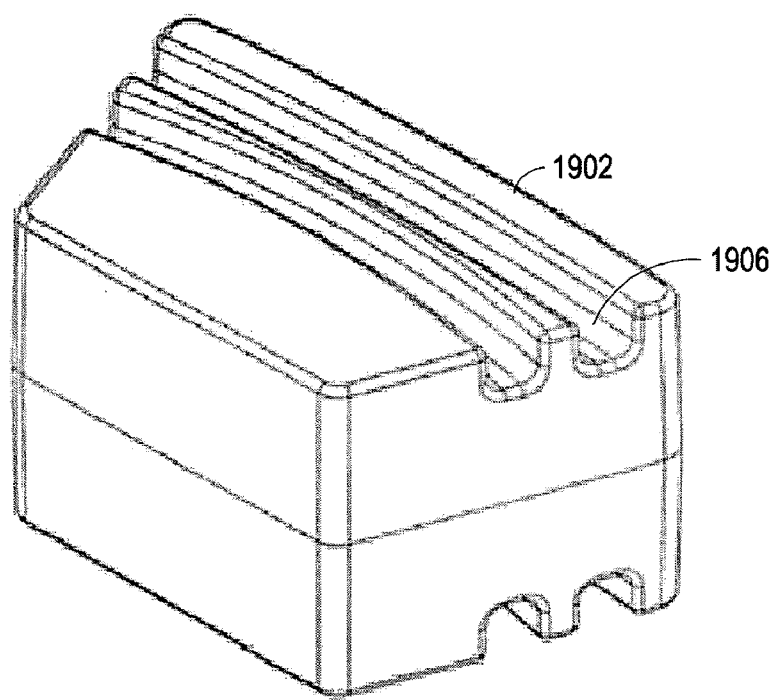
FIG. 19 shows a float, according to some embodiments.
Figure 20:
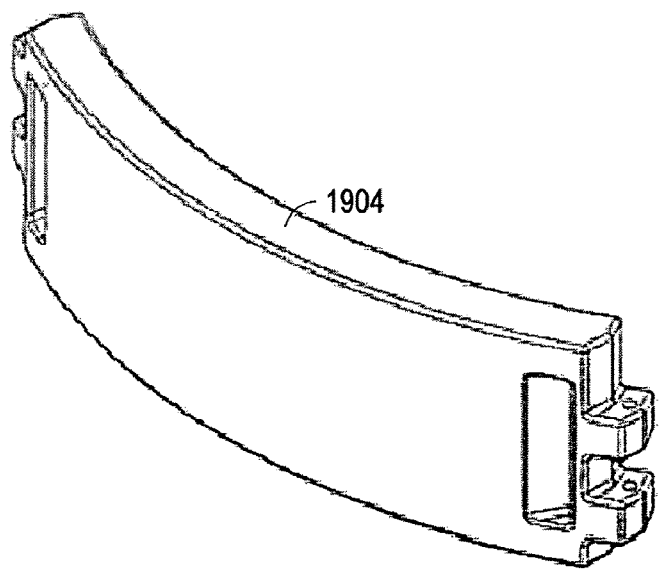
FIG. 20 shows a float, according to some embodiments.

FIG. 18 shows a generator coupled to floats to float in water, according to some embodiments. FIG. 19 shows a float, according to some embodiments. FIG. 20 shows a float, according to some embodiments. A generator system 1802 is floating in a body of water. The system can include moorings, but the present subject matter is not limited to such. Because there is little torque on the base of the generator system 1802, it can float without tipping over, allowing users to deploy the units in water without expensive moorings. Float 1902 is compatible with a tubular space frame to which one or more portions of a housing are coupled. The frame would fit in the channels 1906 (1906 is typical). A further float 1904 can be coupled to the interior of a bottom portion of a housing to further stabilize the housing.

Figure 21:
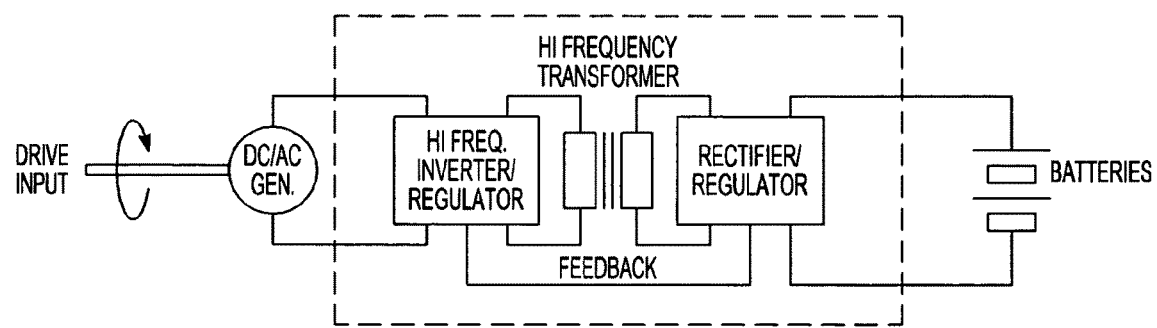
FIG. 21 shows an electrical diagram of a generator system, according to some embodiments.

FIG. 21 shows an electrical diagram of a generator, according to some embodiments. The systems disclosed herein may find practical application as rooftop units, installed atop tall buildings. Such rooftop units must be much smaller than existing designs. New, vertical-axis wind turbine are presented herein. These have been analyzed by using a two-step numerical procedure. The design consists of two turbine cups that are positioned with 180 degrees of separation. In the first step of the analysis, a complete numerical simulation of the wind-flow patterns across the cup was completed. From these calculations, it was possible to determine the functional relationship between rotational forces, relative wind speed, and the relative angle of wind approach. The second stage of numerical procedure was a time-wise integration of the instantaneous angular velocity of the wind turbine. These calculations were carried out until the turbine had achieved quasi-steady motion. The corresponding cycle-averaged angular velocity (terminal angular velocity) was then determined. This second stage was completed for a wind range of wind speeds so that a functional dependence of the turbine rotational velocity on the wide speed could be found. This functional relationship enables a user to predict the operational response of the wind turbine based on a known and steady wind velocity.

Figure 22A:
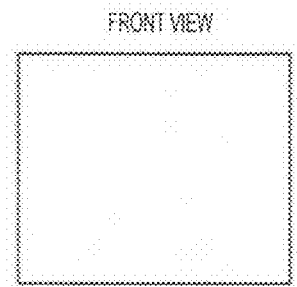
FIG. 22A shows a front view of a blade of an embodiment.
Figure 22B:
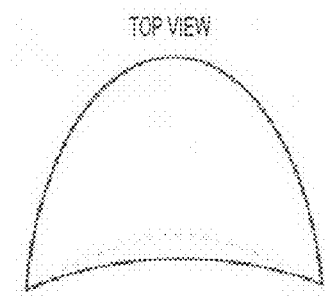
FIG. 22B shows the top view of the blade of FIG. 22A.

FIG. 22A shows a front view of a blade of an embodiment. FIG. 22B shows the top view of the blade of FIG. 22A. Wind-based electrical generation is a fast-growing source of clean power production. Typically, wind-based electricity is produced in large, relatively remote wind-farms which are constituted by turbine populations that vary from tens to hundreds of units. Electricity is then transferred to residential and commercial centers through extensive power grids.

Another future mode of wind-energy generation is through on-sight production and utilization. In this mode, wind-based electricity is generated at a residential or commercial location for immediate use. Such local wind turbines are much smaller than their wind-farm counterparts and typically reach heights of hundreds of feet about ground. Effective local power production requires small wind turbines that are readily adapted to a variety of geometric constraints.

For grid-size wind turbines, larger and taller turbines generally perform better than smaller counterparts due to the physics of wind-power extraction and wind speeds that increase with elevation. The rotational rate of grid-size wind turbines is also restricted to lower ranges for environmental and safety concerns. In rooftop applications, there are fewer restrictions on rotation rate and furthermore, some of the designs are even screened for safety reasons. As a consequence, the design space for rooftop wind turbines is quite different from their grid-sized cousins. The relatively smaller size of rooftop units also limits the power generation to a few kilowatts. Hence, for simplicity and cost reasons the associated electrical generators are typically permanent magnet machines with very efficient conversion and grid-synchronization power electronics.

In this research effort, a novel turbine system has been designed with a number of features that facilitates its use in urban or constrained environments. The major innovations are related to the use of a rectangular profiled cup design and a vertical axis of rotation. A detailed investigation of the first of these features is facilitated by reference to FIGS. 22A-B. The FIGS. show two views of the turbine cup. In the left view, the square profile of the front surface is shown. On the right, a top view of the cup is displayed which clearly exhibits the streamlined nature of the back surface of the cup.

Figure 23A:
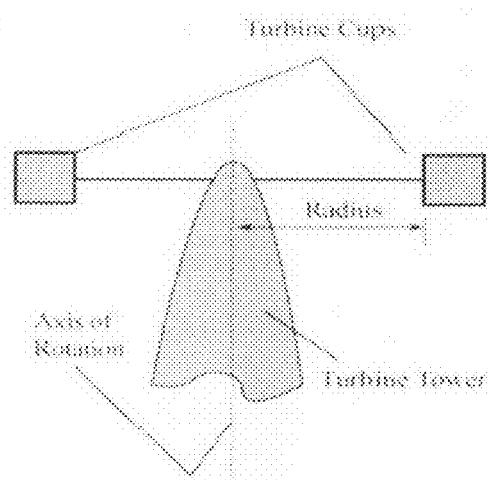
FIG. 23A is a schematic of a model turbine.
Figure 23B:
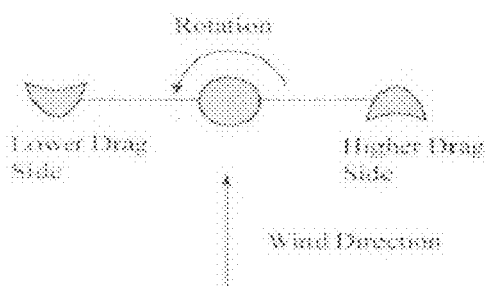
FIG. 23B is a schematic of the model turbine of FIG. 23A.

FIG. 23A is a schematic of a model turbine. FIG. 23A is a schematic of the model turbine of FIG. 23A. When positioned in an airflow, the front and back surfaces of the cup generate differing drag forces due to their blunt and streamlined shapes. As a consequence, the turbine will rotate as shown in FIG. 23B. FIG. 23A shows the turbine cups attached to a schematic tower with the vertical axis of rotation clearly indicated.

The design that is analyzed in this paper consists of two cups, located at 180 degree increments about the axis of rotation. The analysis will include a detailed numerical study of the flow of air across the cups at all circumferential locations. The outcome of the numerical study will be used in a dynamic analysis of the rotational motion. The results of the two-part study will enable a determination of the resulting rotational velocity of the new turbine design. While the analysis completed here will be specific to a specific cup design, the method is universal and would allow calculations for design variations. The profiles of the concave and convex surfaces of the blade structure are, at this point, proprietary so only the general shape of a cup will be disclosed.

Figure 24:
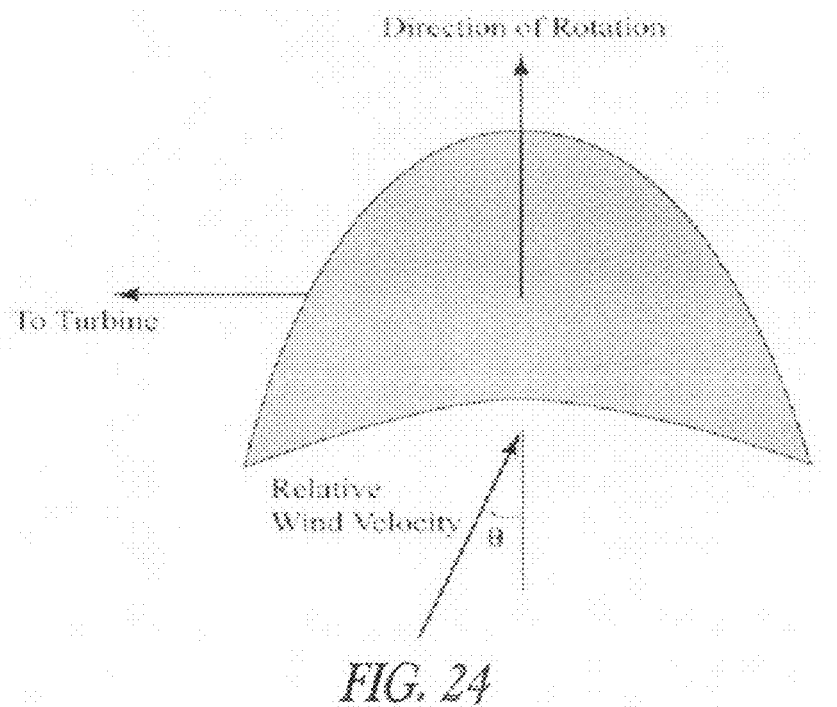
FIG. 24 is a schematic of a blade showing a cross section of the blade.

FIG. 24 is a schematic of a blade showing a cross section of the blade. The fluid modeling was completed using a finite volume computational scheme. The calculations were completed for all combinations of incoming wind speeds and directions. The complexity of the numerical simulations was great due to the rotational motion of the turbine cup which causes a continuously changing relative wind velocity and direction, even though the wind itself was assumed to be steady with regard to speed and direction. Discussion of these issues is aided by reference to FIG. 24 which shows the wind impacting at angle θ on the concave surface of the cup. As the cup completes a cycle about the axis of rotation, the angle θ varies continuously over a 360 degree range. In addition, the rotational velocity dramatically affects the incoming wind velocity relative to the cup. When the cup moves in the same direction as the wind, the relative wind velocity is decreased. On the other hand, when the motion of the cup is into the wind, the relative velocity increases. FIG. 24. Diagram showing cup and incoming wind orientation. The angle θ varies continuously over a 360 degree range.

Figure 25:
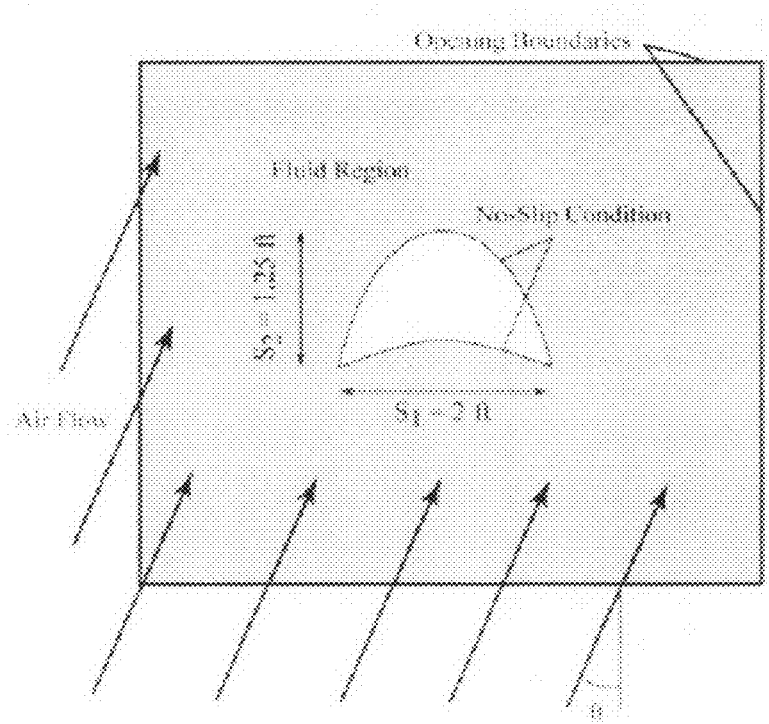
FIG. 25 shows a testing system.

FIG. 25 shows a testing system. All calculations were completed by solving equations which balance mass and momentum flowrates over all finite-volume cells which constitute the fluid region. Those equations, hereby referred to as continuity and momentum conservation, are shown in Equations (1) and (2) in tensor form.

$$\frac{\partial u_i}{\partial x_i} = 0 \quad (1)$$

$$\rho\left(u_i \frac{\partial u_j}{\partial x_i}\right) = -\frac{\partial p}{\partial x_i} + \frac{\partial}{\partial x_i}\left((\mu + \mu_t)\frac{\partial u_j}{\partial x_i}\right) \quad j = 1, 2, 3 \quad (2)$$

All air properties are evaluated at atmospheric pressure and a temperature of 20° C.

The high velocities and the inevitable recirculation patterns guarantee that turbulence will exist within the domain. The present calculations have accommodated turbulence by means of the eddy viscosity, μt, which is displayed on the right-hand side of Equation (2). The shear stress transport model (SST) of Mentor (Menter F, Two-equation eddy-viscosity turbulence models for engineering applications, AIAA J. 1994; 32:1598-1605, incorporated herein by reference) has been used. That model combines the κ-ε model of Jones and Launder (Launder B, Spalding D, Numerical computation of turbulent flows, Comp. Meth. Appl. Mech. Eng. 1974; 3:269-289, incorporated herein by reference) with the κ-ω approach set forth by Wilcox (Wilcox D, Comparison of two-equation turbulence models for boundary layers with pressure gradient AIAA J. 1993; 32:1414-1421; Menter F, Influence of freestream values on k-omega turbulence model predictions AIAA J. 1992; 30:1657-1659, each incorporated herein by reference). The combination of these approaches is performed in such a manner that the κ-ε equations dominate in the near-wall region while κ-ε holds away from the wall. In this way, the advantage of the near-wall calculations of κ-ω are realized yet its sensitivity to free-stream values of the turbulent frequency is mitigated. It has been shown that the SST approach provides superior results for near-wall and separated flow calculations (Malone M, Turbulence model evaluation for free shear dominated flows, AIAA paper 1996-2038, New Orleans, La., 1996; Ladd J, Korakianitis T, On the assessment of one- and two-equation turbulence models for the computation of impinging jet flowfields, AIAA paper 1996-2545, Lake Vista, Fla. 1996; Bush R, A two-equation large eddy stress model for high sub-grid shear, AIAA Paper 2001-2561, Anaheim Calif., 2001; Rumsey C, Gatski T, Morrison J, Turbulence model predictions of strongly curved flow in a U-duct. AIAA J. 2000; 38:1394-1402; Ekaterinas J, Computation of oscillating airfoil flows with one- and two-equation turbulence models. AIAA J. 1994; 32:2359-2365; Menter F, Kuntz M, Langtry R, Ten years of industrial experience with the SST turbulence model. International Symposium on Turbulence Heat and Mass Transfer 4, Antalya, Turkey, Oct. 12-17, 2003; Abraham J, Thomas A, Induced co-flow and laminar-to-turbulent transition with synthetic jets. Computers and Fluids, (in press), each incorporated herein by reference).

The expression of the SST is provided in two extra transport equations for the turbulence kinetic energy, κ and the specific rate of turbulence destruction, ω. The new transport equations, are provided in Equations (3) and (4).

$$\frac{\partial(\rho u_i k)}{\partial x_i} = P_k - \beta_1 \rho k \omega + \frac{\partial}{\partial x_i}\left[\left(\mu + \frac{\mu_t}{\sigma_k}\right)\frac{\partial k}{\partial x_i}\right] \quad (3)$$

and $$\frac{\partial(\rho u_i \omega)}{\partial x_i} = \alpha \rho S^2 - \beta_2 \rho \omega^2 + \frac{\partial}{\partial x_i}\left[\left(\mu + \frac{\mu_t}{\sigma_\omega}\right)\frac{\partial \omega}{\partial x_i}\right] + 2(1-F_1)\rho\frac{1}{\sigma_{\omega 2}\omega}\frac{\partial k}{\partial x_i}\frac{\partial \omega}{\partial x_i} \quad (4)$$

The solution of Equations (3) and (4) yields the turbulent viscosity, μt, in terms of k and ω. It is $$\mu_t = \frac{a\rho k}{\max(a\omega, SF_2)} \quad (5)$$

in which $F_2$ is a blending function that limits the eddy viscosity within the boundary layer.

In these equations, $P_k$ is the rate of production of the turbulent kinetic energy and the σ terms are the Prandtl numbers for transport of turbulent kinetic energy and specific rates of turbulence destruction (ω and ω2). $F_1$ is a blending function that facilitates the combination of the standard κ-ε model and the κ-ω model. The term S is the absolute value of the shear strain rate, and the β terms are model constants.

At all solid-fluid interfaces, the no-slip condition was employed so that the fluid velocity was zero. The turbulent kinetic energy is also zero at these surfaces. A portion of the computational domain nearest the cup is shown in FIG. 4. That FIG. is a two-dimensional top view of the three dimensional extent of the volume under consideration. FIG. 25, which is not drawn to scale, shows that the fluid region completely encloses the cup. Airflow is applied at two orthogonal surfaces of the fluid region. The modeled inlet condition was steady so that the direction and magnitude of the wind did not change in time (no gusts). Also, it was assumed that the wind passed parallel to the base of the wind turbine and did not spatially vary at the blade surface. The calculations were carried out for values of θ which spanned the entire 360 degree range. They also covered the expected range of relative wind velocities.

Opening conditions are used to complete the enclosure which allows air to flow either into or out of the domain. The use of an opening condition is required by the potential for the formation of eddies downstream of the cup. A detailed study was made on the required extent of the solution domain so that the positioning of all boundaries were sufficiently far from the cup so as to not affect the calculations.

Figure 26:
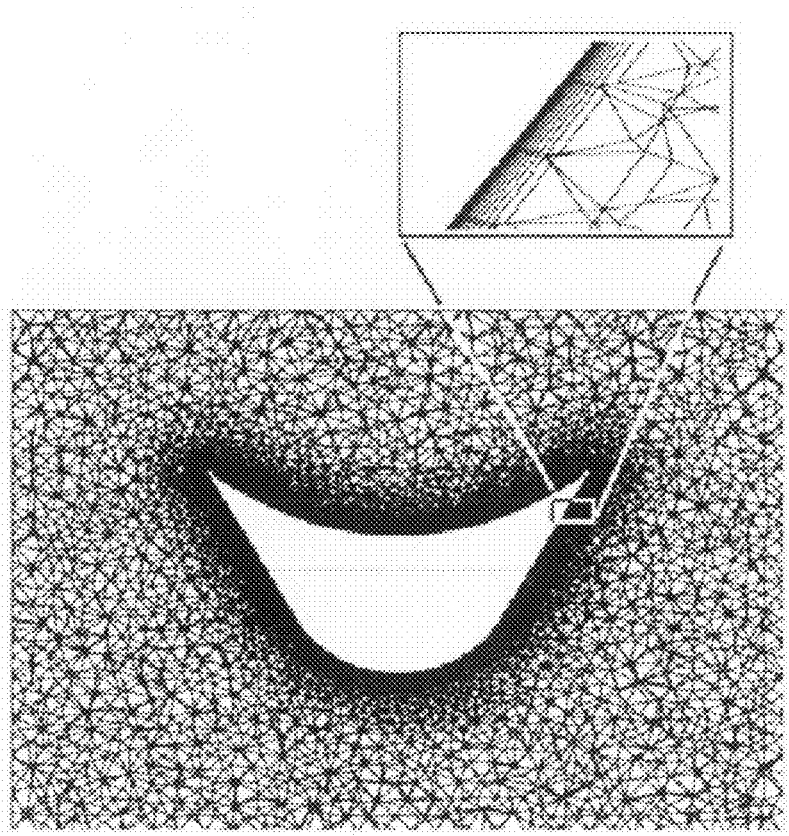
FIG. 26 is a computer model of a blade.

FIG. 26 is a computer model of a blade. The fluid region was subdivided into 2,000,000 elements which were preferentially deployed in regions of high gradients, such as at all fluid-solid interfaces. To accomplish this deployment, thin prismatic elements were placed along all boundaries. A view of the element deployment is shown in FIG. 26, which is a projection of the control volumes taken from a horizontal slice through the three-dimensional region.

Coupling of the velocity-pressure equations was achieved on a non-staggered, collocated grid using the techniques developed in (1616. Rhie C, Chow W, A numerical study of the turbulent flow past an isolated airfoil with trailing edge separation, *AIAA paper* 82-0998, 1982; 1717. Mjumdar S, Role of underrelaxation in momentum interpolation for calculation of flow with nonstaggered grids. *Num. Heat Transfer* 1998; 13:125-132, incorporated herein by reference). The inclusion of pressure-smoothing terms in the mass conservation equation suppresses oscillations which can occur when both the velocity and pressure are evaluated at coincident locations.

The advection terms in the momentum equations were evaluated by using the upwind values of the momentum flux, supplemented with an advection-correction term. The correction term reduces the occurrence of numerical diffusion and is of second-order accuracy. Further details of the advection treatment can be found (see, for example, 1818. Barth T, Jesperson D, The design and applications of upwind schemes on unstructured meshes, *AIAA paper* 89-0366, 1989, incorporated herein by reference).

Figure 27:
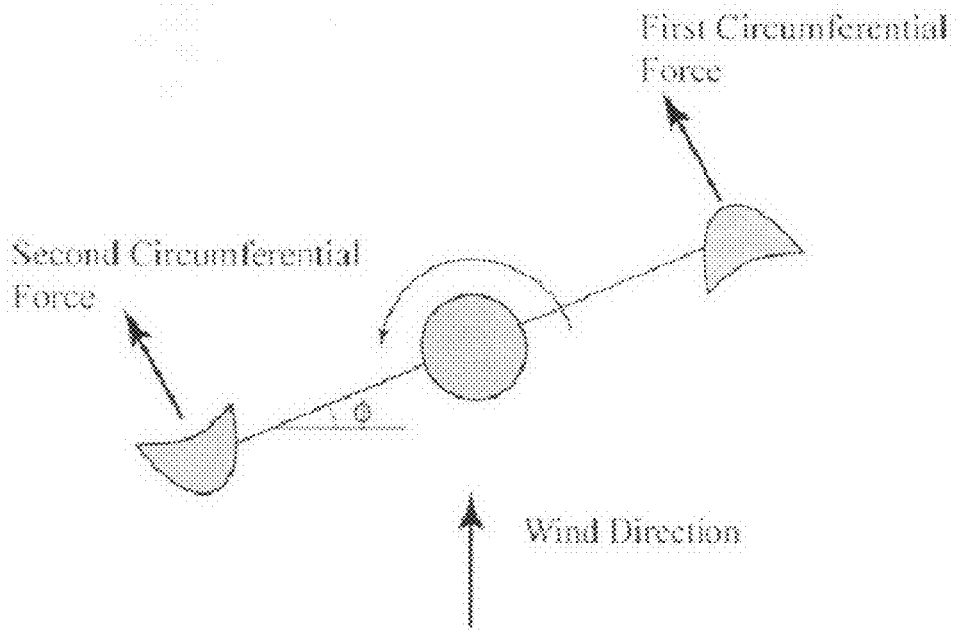
FIG. 27 shows a model of a turbine.

FIG. 27 shows a model of a turbine. The calculations were performed using a false-transient algorithm. Mesh and time-step values were sufficiently small to ensure a solution that was independent of their values. The selected values resulted from an independence study during which both the element sizes and time steps were reduced and results were compared. When the sequential reductions failed to yield noticeable changes in the results, it was determined that the settings were sufficiently refined.

The calculations of the proceeding section were completed for all angles θ and for a number of relative wind velocities. For each calculation, the circumferential force was determined by integrating pressure and shear forces over all surfaces of the cup. The resulting circumferential force, which at all instances is tangent to the direction of motion, provides the torque about the axis of rotation. A diagram of the circumferential forces on the two cups is shown in FIG. 27. It is worthy of note that in most positions, the two forces provide opposing moments, with one force acting to continue rotation and the other acting to slow the rotational velocity.

With the two forces now determined, it is possible to construct an equation which describes the rotational motion of the two-cup system. That equation, shown below contains the moment of inertia of the system, I=2.9 $lb_m ft^2$, and the instantaneous angular acceleration, α.

$$I\alpha = M_1 - M_2 = (F_1 - F_2) \cdot \text{Radius} \quad (6)$$

The model, as presented in Equation 5 ignores frictional losses due to rotation, and drag forces in the thin beams which connect the cups to the turbine.

In Equation (6), F1 and F2 are, respectively, the forces promoting and opposing rotation. As evident from the description of the fluid flow calculations, the two forces $F_1$ and $F_2$ are continuous functions of both the relative wind speed and of the angle of incidence of the wind. The functional dependence of the circumferential forces can be represented as $$F = f(\theta, |V_{rel}|) \quad (7)$$

When this expression is inserted into Equation (6), motion equation becomes $$I\frac{d\omega'}{dt} = (f(\theta_1, |V_{rel}|_1) - f(\theta_2, |V_{rel}|_2)) \cdot \text{Radius} \quad (8)$$

In Equation (8), ω' is the instantaneous angular velocity and is equal to $$\frac{d\phi}{dt} = \omega', \quad (9)$$

where angle φ is the angle of inclination of the turbine system with respect to the wind, as shown in FIG. 6.

Equations (8) and (9) completely determine the progression of motion. The non-linearity of the system requires that the solution of these coupled equations be obtained numerically using a time-stepping solution procedure. The algorithm provides the progression of the angular position and velocity of the turbine based on initial conditions for both φ and ω'.

Using the symbol n to reference the current time step, Equation (8) is evaluated based at the current time-step as shown in Equation (10).

$$I\frac{d(\omega')^n}{dt} = (f(\theta_1, |V_{rel}|_1)^n - f(\theta_2, |V_{rel}|_2)^n) \cdot \text{Radius} \quad (10)$$

Then, with $(\omega')^n$ determined, the incremental change in the angular position and velocity of the turbine is calculated from a forward-stepping integration, as shown in the following $$\Phi^{n+1} = (\omega')^n \cdot \Delta t + \Phi^n \quad (11)$$

and $$(\omega')^{n+1} = (\alpha)^n \cdot \Delta t + (\omega')^n \quad (12)$$

where α is the angular acceleration. In all calculations, the time step was selected to ensure both numerical stability and accuracy. Accuracy was ensured by successively reducing the numerical integration time steps until no difference in outcome was observed.

The new information is used to update the wind speed and angle of incidence which then allow a determination of newly updated forces F1 and F2, and a continuation of the calculation procedure.

The time-stepping calculations of Equations (11) and (12) was carried out until the wind turbine reached a quasi-steady motion. The motion of the turbine accelerated during part of its rotation and decelerated during other portions. Quasi-steady motion is achieved when the time integrated acceleration equaled the same integration of deceleration throughout one complete cycle. For quasi-steady motion, the instantaneous angular velocities evaluated at one cycle are identical to those evaluated at a subsequent cycle.

Figure 28:
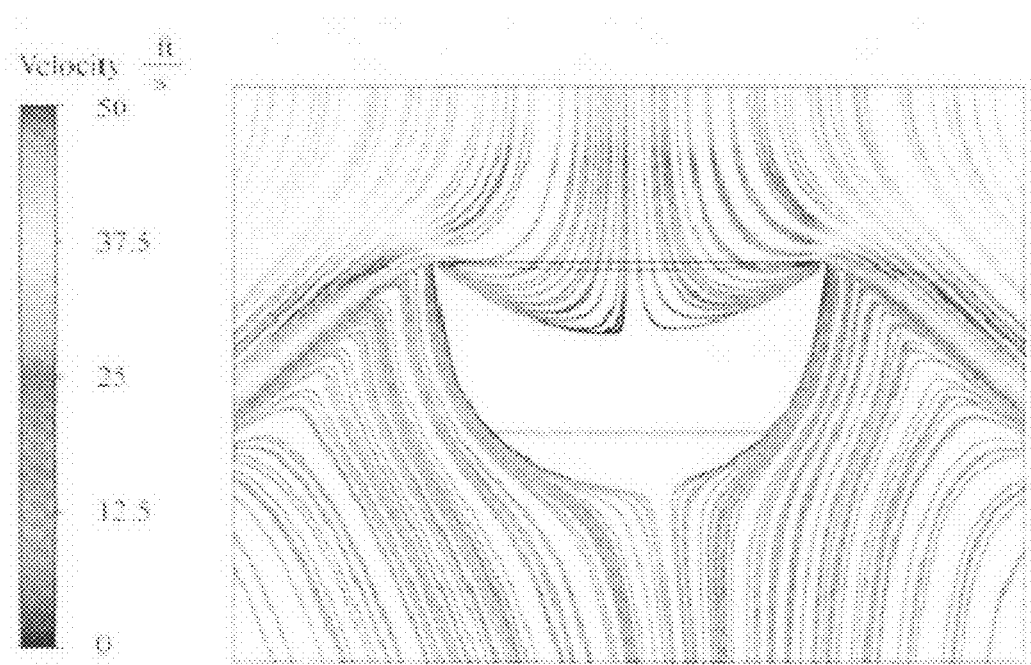
FIG. 28 shows a diagram of a fluid flow model of a blade.

FIG. 28 shows a diagram of a fluid flow model of a blade. Results from the fluid analysis are best illustrated by visualization of the flow field. To facilitate the following discussion, representative results corresponding to airflow angles-of-incidence of 0, 60 and 120 degrees are shown. The first set of results is displayed in FIG. 28, which shows streamlines of the flow passing normal to the concave surface of the cup. FIG. 28 shows streamline pattern for flow with an incident angle of 0 degrees, color-coded by velocity magnitude corresponding to a relative wind speed of 20 miles/hour (29.3 feet/sec). The streamlines, which are color-coded by the velocity scale on the left side of FIG. 28, have been obtained on a two-dimensional cross-sectional cut through the cup and fluid region. It should be noted that the solution was, in fact, fully three dimensional. The results of FIG. 28 are for an incident velocity of 20 miles per hour (29.3 feet/sec). The deflection of streamlines on the front face of the cup is evident, as is the separation of flow on the downstream surfaces. In FIG. 28, the airflow passes downwards, over the front surface of the cup.

Figure 29:
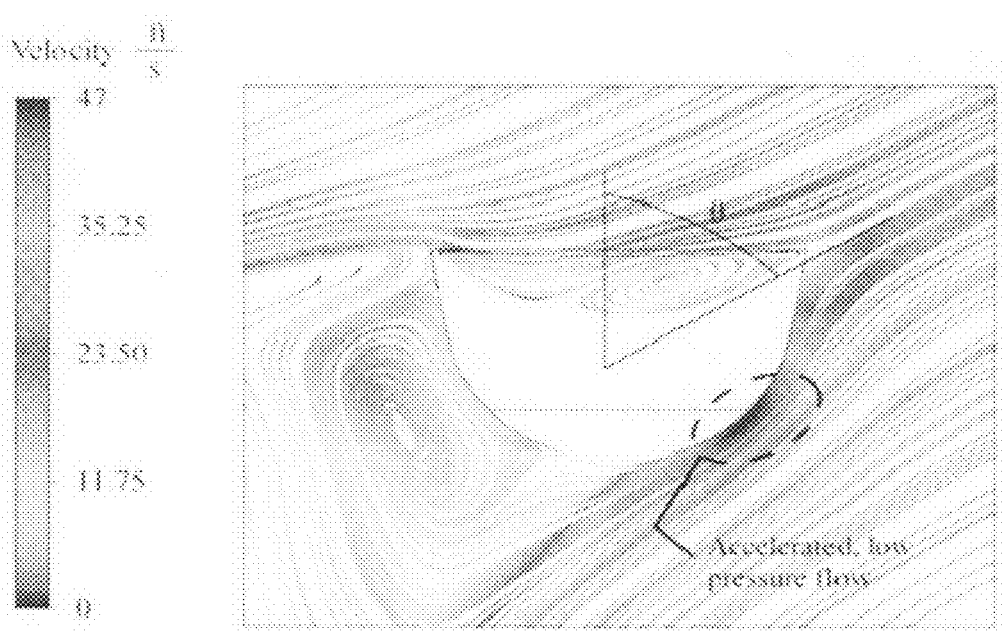
FIG. 29 shows a diagram of a fluid flow model of a blade.
Figure 30:
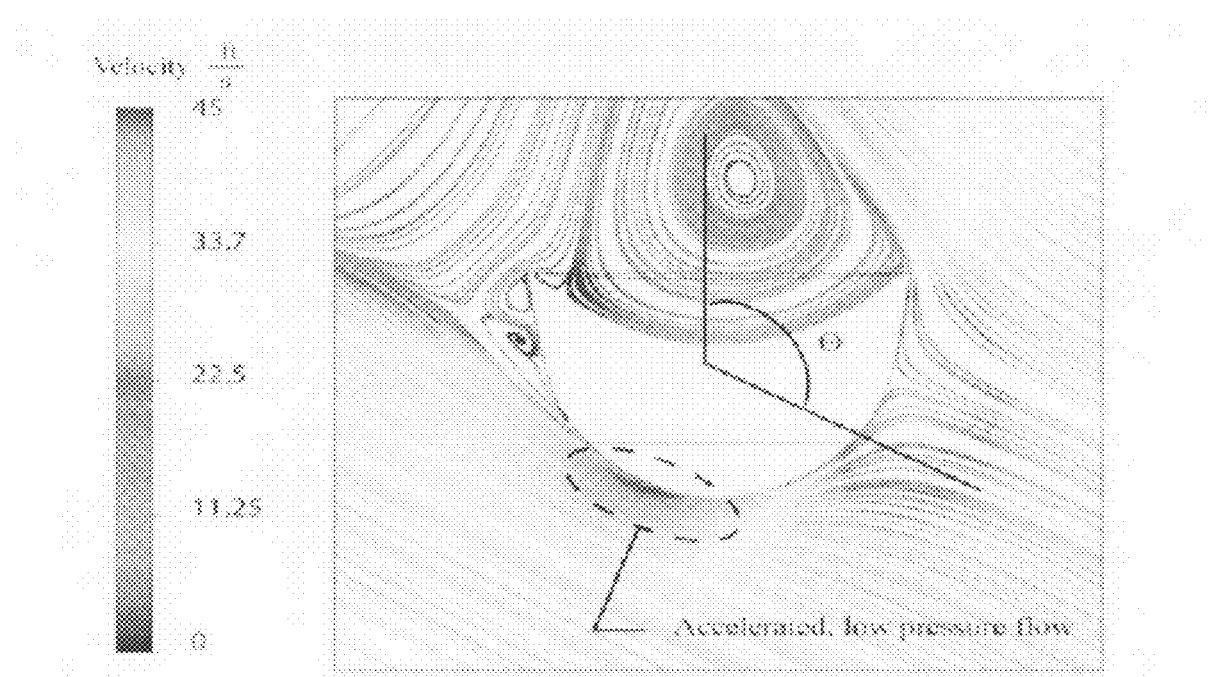
FIG. 30 shows a diagram of a fluid flow model of a blade.

The aforementioned deflection of flow at the front surface of the cup causes a rise in local air pressure as the kinetic energy of the air is converted to pressure. The pressure and shear stress distributions across the entire surface of the cup were integrated to provide the overall net circumferential forces which result in rotation of the turbine blade. A corollary set of FIGS. for the cases of incident angles of 60 and 120 degrees are presented in FIGS. 29 and 30, respectively. FIG. 29 shows a diagram of a fluid flow model of a blade, i.e. streamline pattern for flow with an incident angle of 60 degrees, color-coded by velocity magnitude corresponding to a relative wind speed of 20 miles/hour (29.3 feet/sec). FIG. 30 shows a diagram of a fluid flow model of a blade. It includes streamline pattern for flow with an incident angle of 120 degrees, color-coded by velocity magnitude corresponding to a relative wind speed of 20 miles/hour (29.3 feet/sec). The FIGS. show the streamline pattern including separation and the pressure distribution on the front face of the cup. Of note is a region of high velocity flow which, with its corresponding low pressure, creates a component of tangential force which aides in rotating the turbine blade.

The flow depictions set forth in FIGS. 28-30 are illustrative and serve to demonstrate the complicated flow patterns which exist in the region near the turbine cup. Similar results have been obtained for multiple angles θ and relative wind velocities but are not shown here for brevity.

With the flow field calculations completed and tangential forces available at multiple relative wind velocities and angles, the numerical integration shown in Equations (11) and (12) can be completed. The calculations utilized a time-step increment, Δt, of 0.01 seconds. The calculations were continued from an imposed initial value of both ω' and φ until a quasi-steady state was reached. The achievement of quasi-steady motion was determined when the cycle-to-cycle variation of the angular velocity ω' was less than 1%.

The cycle-average angular velocity which corresponds to the quasi-steady state, hereafter called the terminal angular velocity, was obtained for multiple wind velocities so that the turbine response can be determined for any wind speed. A depiction of sample results is shown in FIG. 10 where the angular velocity is shown for an entire cycle and for three wind velocities, 14.7, 29.3, and 44 feet/sec, which are equivalent to, respectively 10, 20, and 30 miles per hour. The FIG. shows results for a 180 degree variation of the angle φ. The two cup system experiences periodic motion so that the pattern of angular velocity is repeated for every 180 degrees of motion.

Figure 31:
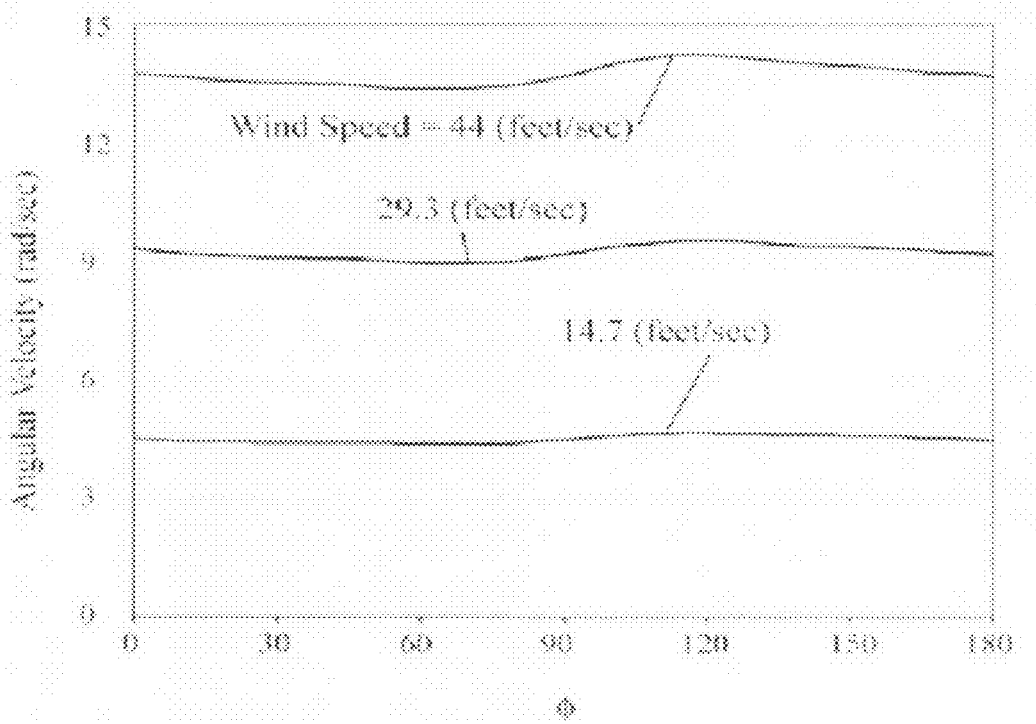
FIG. 31 shows a chart of test results.

FIG. 31 shows a chart of test results. It includes values of the angular velocity for wind speeds of 14.7, 29.3, and 44 (feet/sec) which correspond, respectively, to 10, 20, and 30 miles/hour. For all cases presented in FIG. 31, it is seen that the angular velocity of the turbine varies slightly throughout the cycle. The terminal angular velocity for a given case is calculated by integrating the instantaneous angular velocity over the entire period of motion. When the terminal velocity is obtained for a sequence of wind velocities, it is possible to develop a functional relationship between the two variables. Such a functional relationship is shown graphically in FIG. 32. While calculations were carried out using units of feet/sec for wind velocity, it is appropriate to express the final results in miles/hour, which is more commonly used to describe local wind speed.

Figure 32:
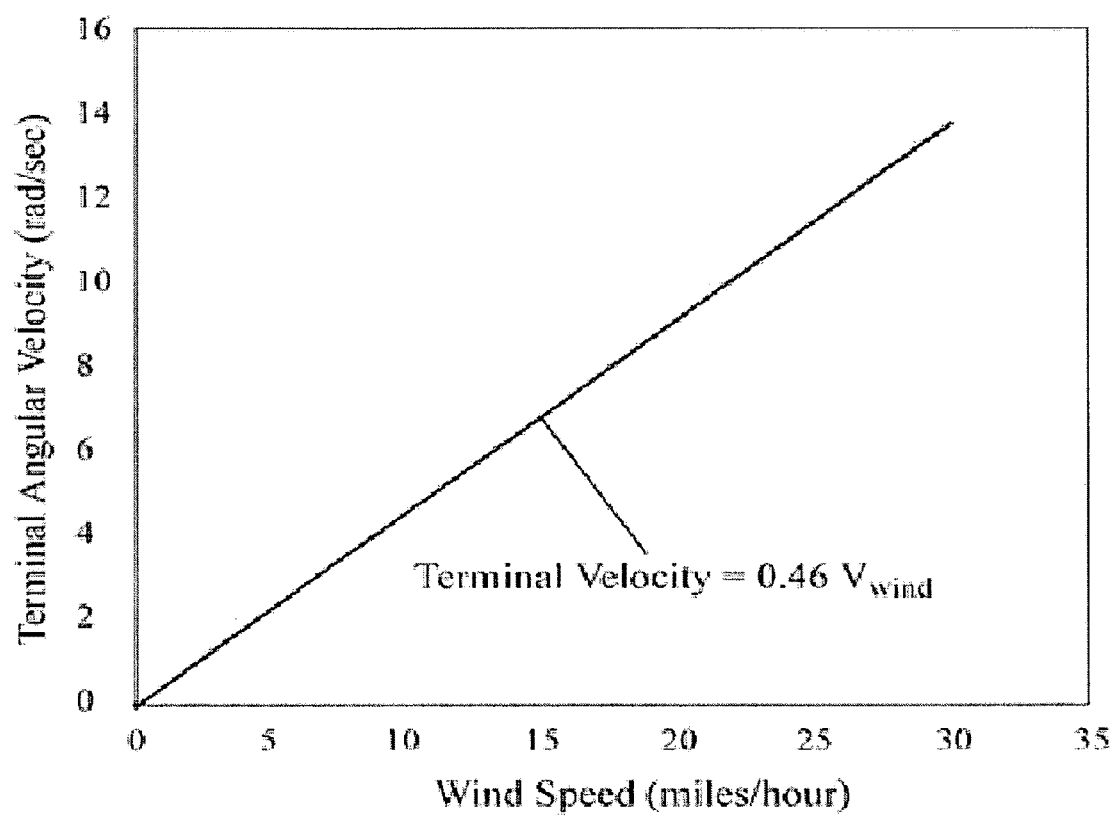
FIG. 32 shows a chart of test results.

FIG. 32 shows a chart of test results. It includes variation of terminal velocity with wind speed. The results of FIG. 32 show that the terminal velocity depends linearly on the magnitude of the wind speed. This linear dependence is somewhat unexpected because in general, the circumferential force exerted on the cup varies as $V_{wind}^2$. On the other hand, it must be recognized that for most of the rotational period, the two cups experience two, counteracting forces. This fact tends to diminish the sensitivity of the angular velocity on the wind speed. The data illustrated in FIG. 32 has great utility in that it can be used to predict the final rotational velocity of the wind turbine for any incoming, steady wind speed and ultimately, the power generated by the wind turbine.

A two-step numerical simulation has been used to evaluate the efficacy of a new, vertical axis, small-scale wind turbine. The turbine possesses cups with a square front face and a smoothly contoured rear body which results in a net positive moment when the turbine is positioned in blowing air. Other features of the turbine include its very small profile which facilities its use in crowded, urban rooftop applications.

The numerical analysis consisted of a detailed simulation of the airflow patterns which exist across the cup surfaces. Calculations were made for a wide range of approach velocities and angles. These results enabled the continuous calculations of circumferential forces to be made on a two-cup system. Based on the circumferential forces, it was possible to determine the quasi-steady rotational motion of the turbine for a collection of steady wind velocities. The calculations ignored frictional losses within the turbine housing. Calculations of the rotary motion were completed using a forward-stepping numerical integration in time. Convergence was determined when the cycle-to-cycle variation in the angular velocity was less than 1%.

The results presented here are summarized in a function which relates the terminal angular velocity to the wind speed. That functional relationship enables a user to predict angular velocity of some turbine system embodiments.

Figure 33:
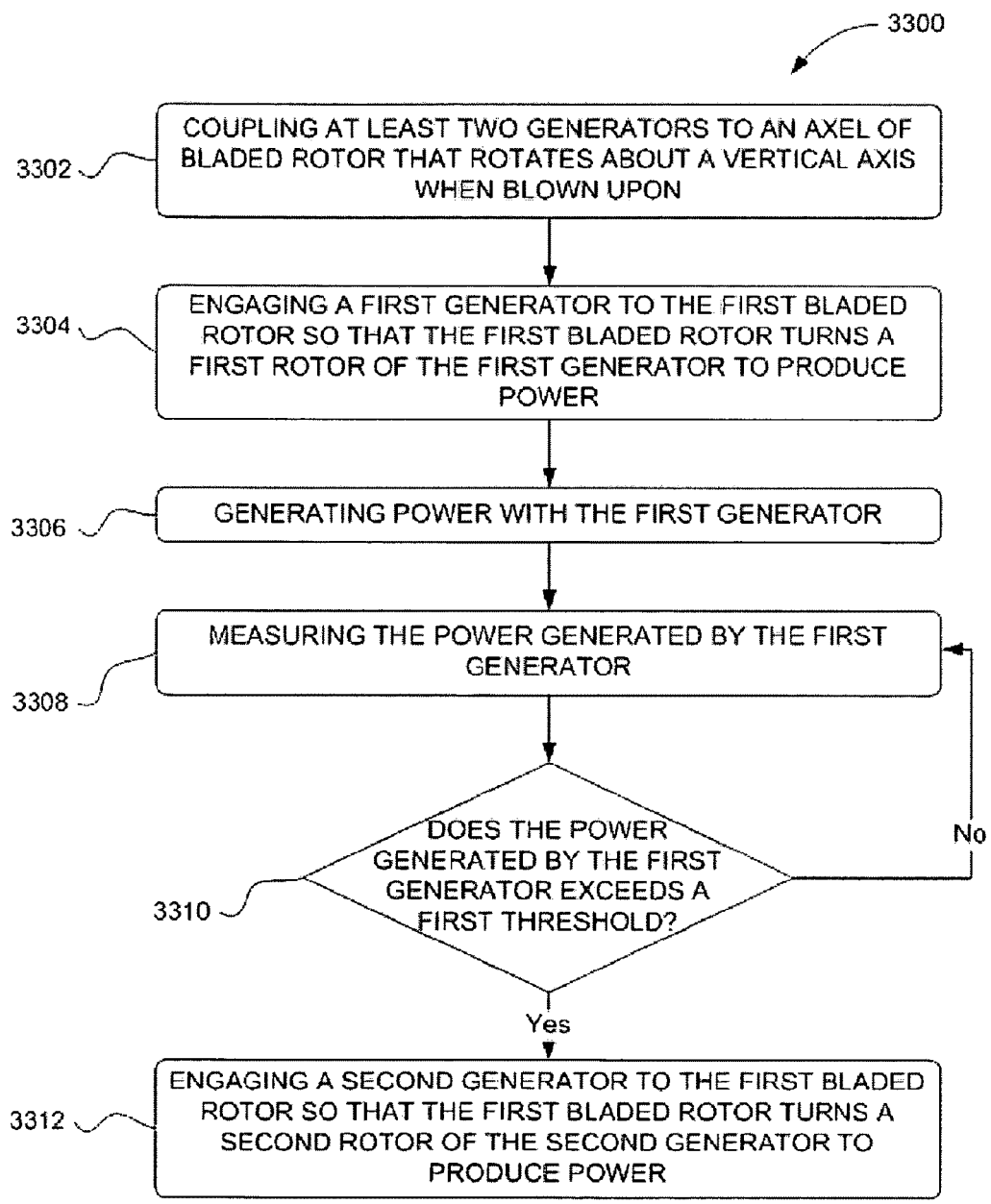
FIG. 33 shows a method, according to some embodiments.

FIG. 33 shows a method 3300, according to some embodiments. At 3302, the method includes coupling at least two generators to an axel of bladed rotor that rotates about a vertical axis when blown upon. At 3304, the method includes engaging a first generator to the first bladed rotor so that the first bladed rotor turns a first rotor of the first generator to produce power. At 3306, the method includes generating power with the first generator. At 3308, the method includes measuring the power generated by the first generator. At 3310, the method includes a decision asking whether the power generated by the first generator exceeds a first threshold. At 3312, if the decision of 3310 is answered, yes, the method includes engaging a second generator to the first bladed rotor so that the first bladed rotor turns a second rotor of the second generator to produce power. Otherwise, the method 3302 returns to 3308.

Some embodiments of the method include coupling additional blades to the first bladed rotor only after the power generated by first generator exceeds the first threshold. Some embodiments include, after a further power generated by the first and second generators exceeds a second threshold, providing an indication to a user and stacking a second bladed rotor onto the first bladed rotor after the indication is provided, wherein the stacking comprises aligning an axel of the second bladed rotor with the axel of the first bladed rotor. In some of these methods, providing an indication includes illuminating a green lamp. Some methods of the present subject matter includes mechanically coupling the axel of the first bladed rotor directly to the axel of the second bladed rotor.

Figure 34:
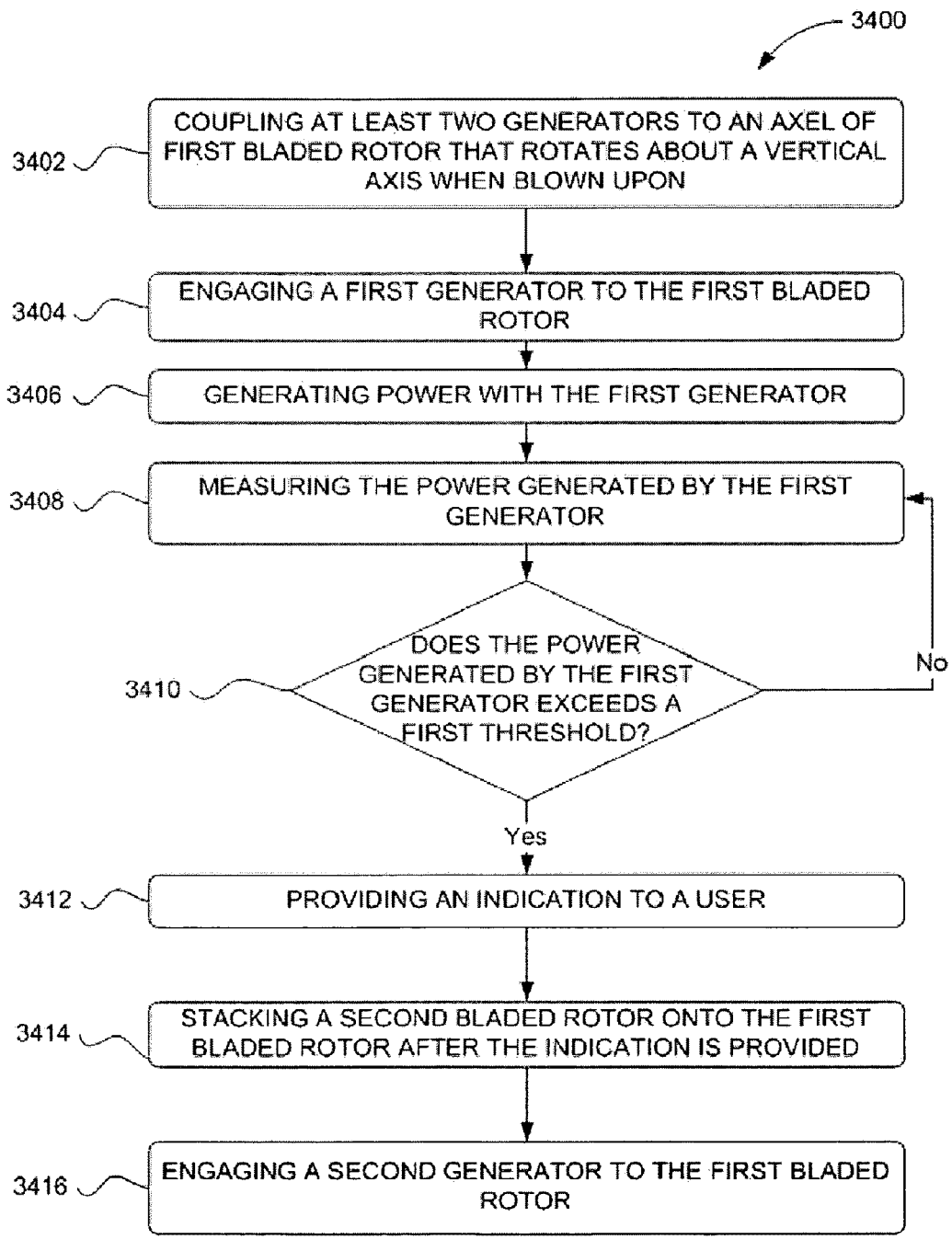
FIG. 34 shows a method, according to some embodiments.

FIG. 34 shows a method 3400, according to some embodiments. At 3402, the method includes coupling at least two generators to an axel of first bladed rotor that rotates about a vertical axis when blown upon. At 3404, the method includes engaging a first generator to the first bladed rotor. At 3406, the method includes generating power with the first generator. At 3408, the method includes measuring the power generator by the first generator. At 3410 the method includes a decision as to whether the power generated by the first generator exceeds a first threshold. At 3412, if the decision of 3410 results in yes, the method includes providing an indication to a user. At 3414, if the decision of 3410 results in yes, the method includes stacking a second bladed rotor onto the first bladed rotor. At 3416, if the decision of 3410 results in yes, the method includes engaging a second generator to the first bladed rotor.

In some embodiments, stacking comprises aligning an axel of the second bladed rotor with the axel of the first bladed rotor. Some methods include mechanically coupling the axel of the first bladed rotor directly to the axel of the second bladed rotor. Some methods include coupling additional blades to the first bladed rotor only after the power generated by first generator exceeds the first threshold. In some embodiments, a rotor has predetermined coupling spots, e.g. bolt holes, which can accommodate configurations in which any of 3-5 blades are coupled to the rotor equidistant from one another around the circumference of the rotor. Some methods includes coupling additional blades to the first bladed rotor only after the power generated by first generator exceeds the first threshold.

The embodiments described above are intended only to illustrate and teach one or more ways of practicing or implementing the present invention, not to restrict its breadth or scope. The actual scope of the invention, which embraces all ways of practicing or implementing the teachings of the invention, is defined only by the following claims and their equivalents. The claims are hereby incorporated into the detailed description, with each claim standing on its own as a separate embodiment.

The Abstract is provided to comply with 37 C.F.R. Section 1.72 (b) requiring an abstract that will allow the reader to ascertain the nature and gist of the technical disclosure. It is submitted with the understanding that it will not be used to limit or interpret the scope or meaning of the claims.

What is claimed is:

1. An apparatus, comprising
an axle extending along a center axis; and
a plurality of cup shaped blades coupled to the axle around the center axis, each blade comprising:
a concave face having a parabolic concavity along a plane parallel to the center axis, the parabolic concavity having a first focus and a first vertex; and
a convex tail having an exterior surface that is parabolic along the plane parallel to the center axis, the exterior surface having a second focus coincident the first focus in the plane and a second vertex in the plane,
wherein a distance between the first focus and the first vertex is less than a distance between the second focus and the second vertex.

2. The apparatus of claim 1, wherein the concave face has a further parabolic cross section taken along a plane normal to the center axis.

3. The apparatus of claim 2, wherein the convex tail as a parabolic shape along the plane normal to the center axis.

4. The apparatus of claim 1, wherein each of the plurality of blades is symmetrical along the plane parallel to the center axis.

5. The apparatus of claim 4, wherein each of the plurality of blades is symmetrical along another plane that is normal to the plane.

6. The apparatus of claim 1, wherein the concave face includes a first parabolic surface, and the convex tail includes a second parabolic surface, with the first and second surfaces joining at a joint that circumscribes the concave face along a joint plane.

7. The apparatus of claim 6, wherein the center axis is in the joint plane.

8. The apparatus of claim 7, wherein each blade is hollow.

9. The apparatus of claim 1, further comprising an electric generator coupled to the axle to convert rotational energy into electric energy.

10. An apparatus, comprising
an axle extending along a center axis; and
a plurality of cup shaped blades coupled to the axle around the center axis, each blade comprising:
a concave face having a parabolic concavity along a plane parallel to the center axis, the parabolic concavity having a first focus and a first vertex; and
a convex tail having an exterior surface that is parabolic along the plane parallel to the center axis, the exterior surface having a second focus coincident the first focus in the plane and a second vertex in the plane,
wherein a distance between the first focus and the first vertex is around one third of a distance between the second focus and the second vertex.

11. The apparatus of claim 10, wherein the concave face has a further parabolic cross section taken along a plane normal to the center axis.

12. The apparatus of claim 11, wherein the convex tail has a parabolic shape along the plane normal to the center axis.

13. The apparatus of claim 10, wherein each of the plurality of blades is symmetrical along the plane parallel to the center axis.

14. The apparatus of claim 13, wherein each of the plurality of blades is symmetrical along another plane that is normal to the plane.

15. The apparatus of claim 10, wherein the concave face includes a first parabolic surface, and the convex tail includes a second parabolic surface, with the first and second surfaces joining at a joint that circumscribes the concave face along a joint plane.

16. The apparatus of claim 15, wherein the center axis is in the joint plane.

17. The apparatus of claim 16, wherein each blade is hollow.

18. The apparatus of claim 10, further comprising an electric generator coupled to the axle to convert rotational energy into electric energy.

19. The apparatus of claim 1, wherein a distance between the first vertex and the second vertex is greater than a distance between either the distance between the first focus and the first vertex or the distance between the second focus and the second vertex.

20. The apparatus of claim 10, wherein a distance between the first vertex and the second vertex is greater than a distance between either the distance between the first focus and the first vertex or the distance between the second focus and the second vertex.

* * * * *